(12) United States Patent
Ikemoto et al.

(10) Patent No.: US 7,590,327 B2
(45) Date of Patent: Sep. 15, 2009

(54) WAVEGUIDE AND LIGHT EMITTING DEVICE HAVING THE SAME

(75) Inventors: Kiyokatsu Ikemoto, Yokohama (JP); Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 11/843,487

(22) Filed: Aug. 22, 2007

(65) Prior Publication Data
US 2008/0316766 A1 Dec. 25, 2008

(30) Foreign Application Priority Data
Aug. 25, 2006 (JP) ............................... 2006-229476

(51) Int. Cl.
*G02B 6/10* (2006.01)
(52) U.S. Cl. ...................... 385/131; 385/129; 385/122; 385/146; 385/142
(58) Field of Classification Search ................ 385/31, 385/147, 146, 129, 130, 131, 132, 141, 122, 385/14; 362/582
See application file for complete search history.

(56) References Cited

U.S. PATENT DOCUMENTS

| 7,209,622 | B2 * | 4/2007 | Hoshi et al. | ................. 385/129 |
| 2003/0002846 | A1 | 1/2003 | Sigalas | |
| 2004/0264903 | A1 | 12/2004 | Dridi et al. | |
| 2006/0275005 | A1 * | 12/2006 | Hoshi et al. | ................. 385/129 |
| 2008/0073661 | A1 * | 3/2008 | Takagi | ........................... 257/98 |
| 2008/0316766 | A1 * | 12/2008 | Ikemoto et al. | ............. 362/582 |
| 2009/0022446 | A1 * | 1/2009 | Hoshi | ........................... 385/3 |

FOREIGN PATENT DOCUMENTS

| EP | 1574884 | 9/2005 |
| JP | 2001074955 | 3/2001 |

OTHER PUBLICATIONS

Eli Yablonovitch, "Inhibited Spontaneous Emission in Solid-State Physics and Electronics", Physical Review Letters, May 18, 1987, vol. 58, No. 20, pp. 2059-2062.
The 65th Lecture of Japan Society of Applied Physics, Lecture Proceedings, p. 936, No. 3.

* cited by examiner

*Primary Examiner*—Brian M Healy
(74) *Attorney, Agent, or Firm*—Fitzpatrick, Cella, Harper & Scinto

(57) ABSTRACT

A waveguide based on a three-dimensional photonic crystal is arranged to provide wave-guiding in a single mode and a mode having a field strength distribution with unimodality in a plane perpendicular to the wave-guiding direction, to thereby enable wave-guiding in a desired frequency band, wherein the three-dimensional photonic crystal has a plurality of line defect members which include a first line defect member made of a medium having a refractive index not smaller than that of the columnar structures and formed in a direction perpendicular to the direction in which the columnar structures extend, and a second line defect member formed in the same direction as the first line defect member.

15 Claims, 25 Drawing Sheets

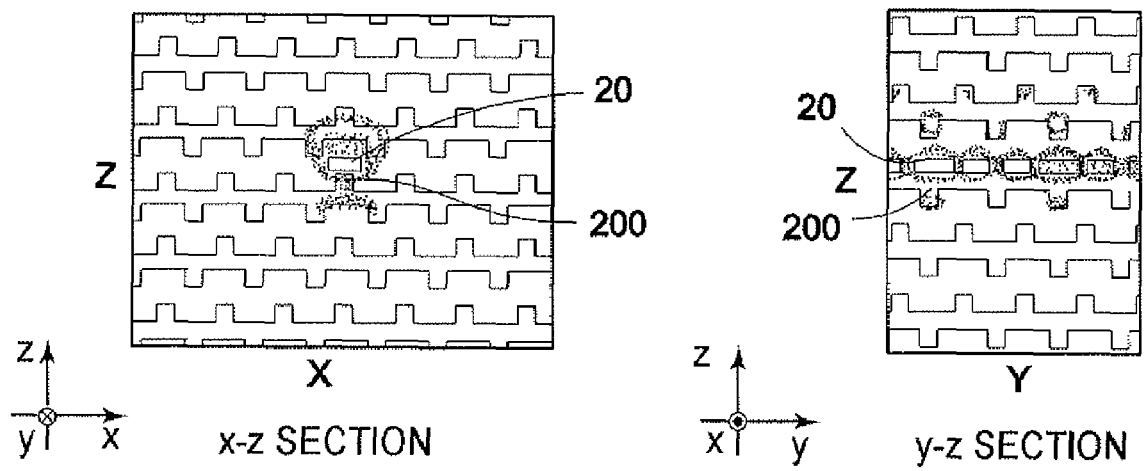
FIG.7A  FIG.7B
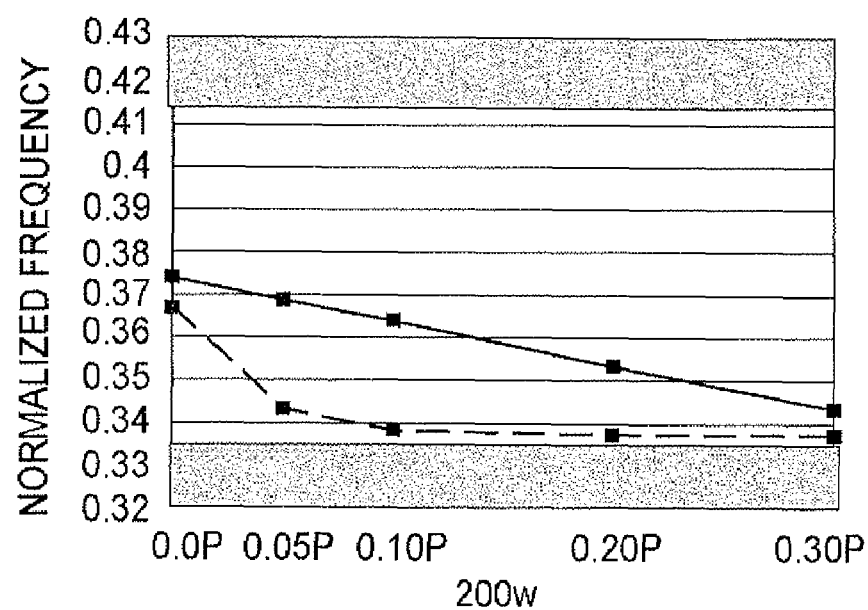
FIG.7C

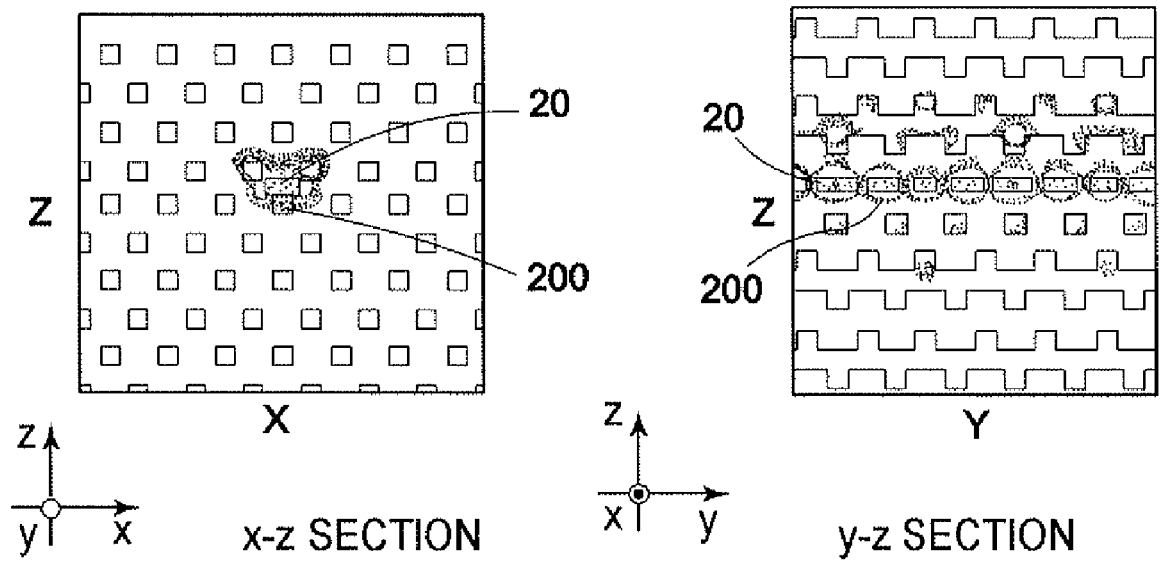
FIG.8A  FIG.8B
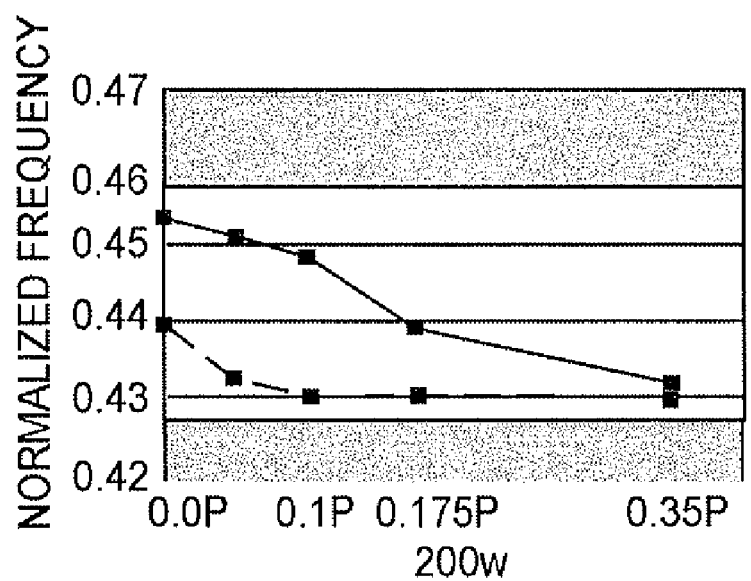
FIG.8C

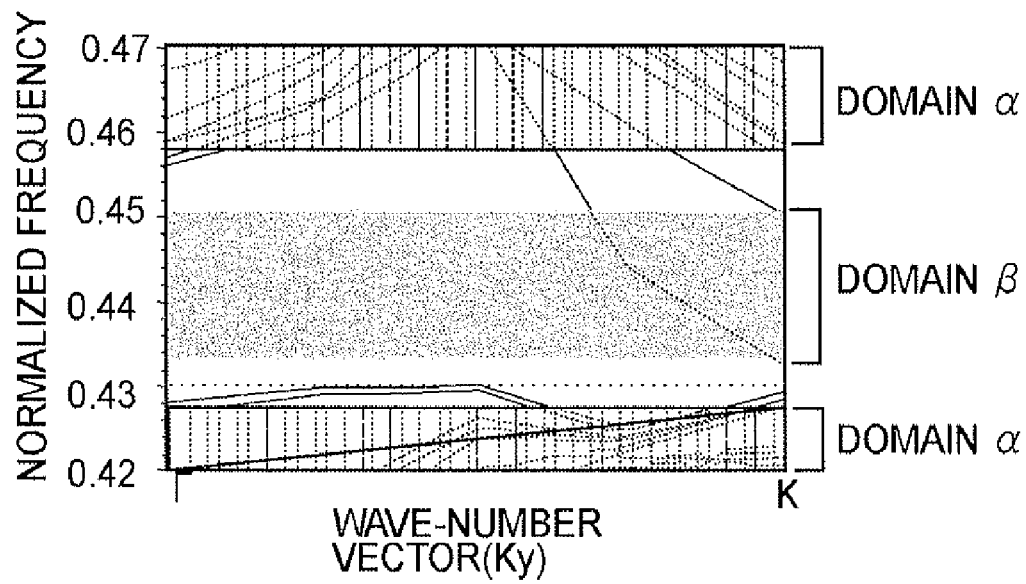
FIG.10A
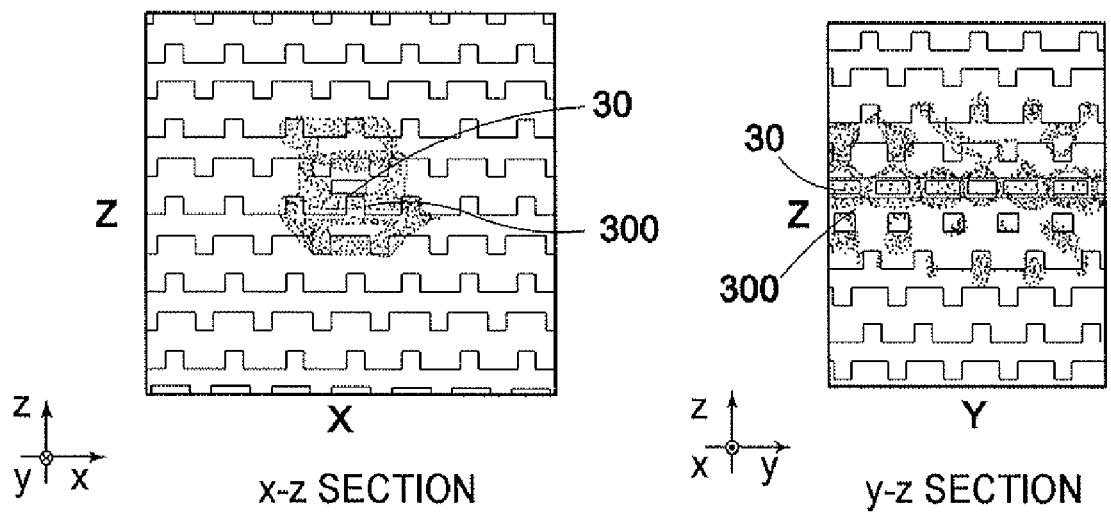
FIG.10B
FIG.10C

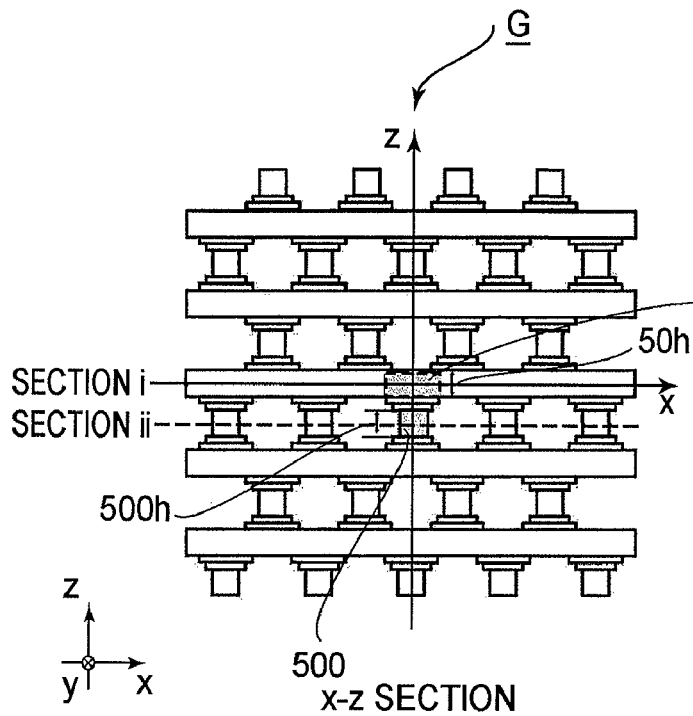
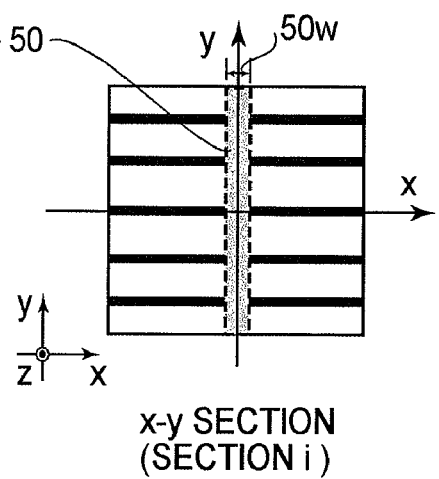
FIG.15A  FIG.15B
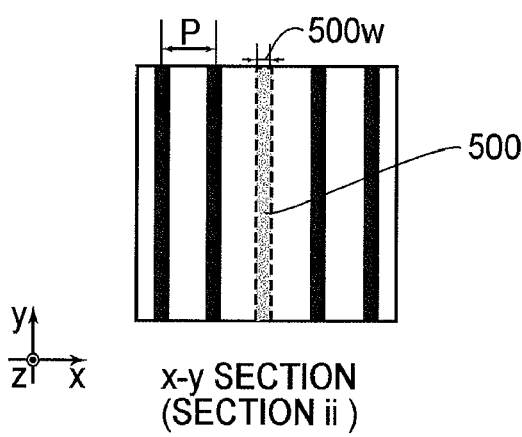
FIG.15C

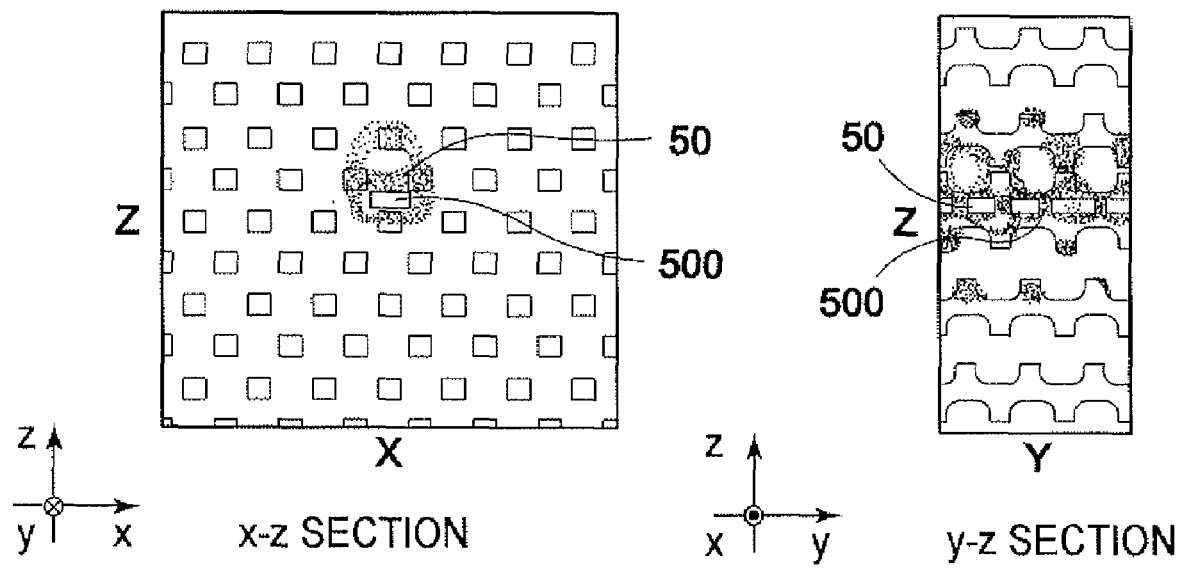
FIG.19A   FIG.19B
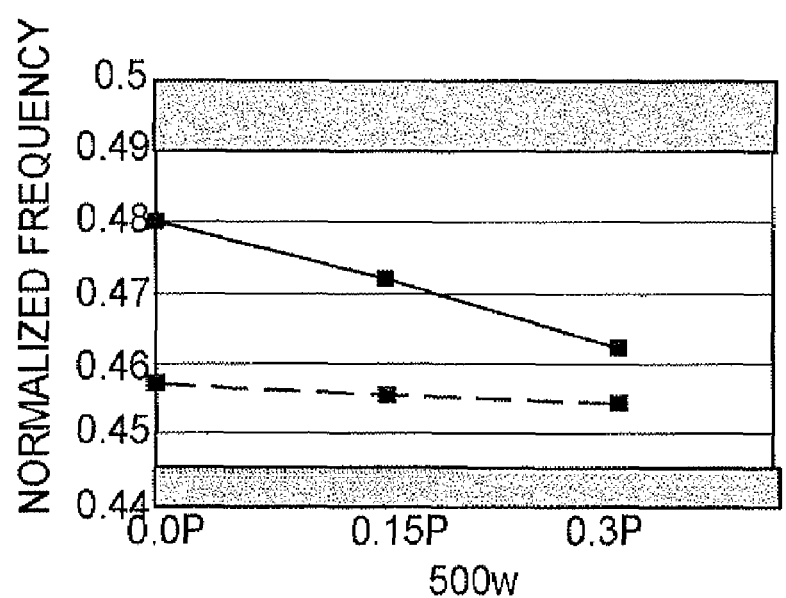
FIG.19C

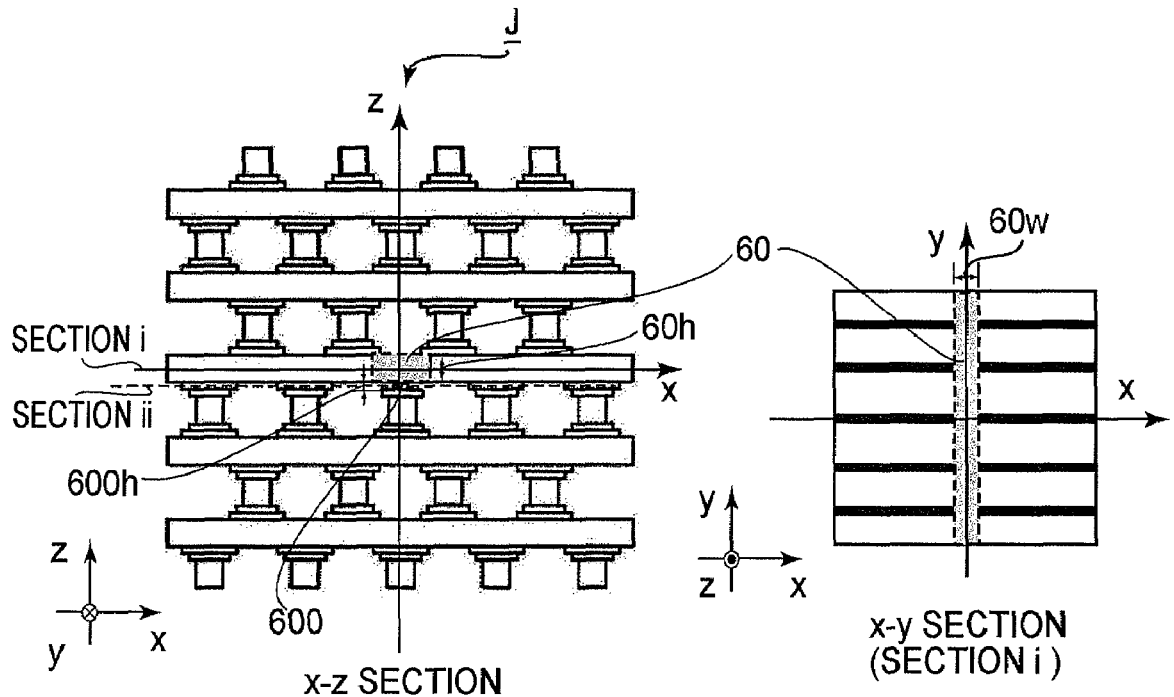
FIG.20A x-z SECTION
FIG.20B x-y SECTION (SECTION i)
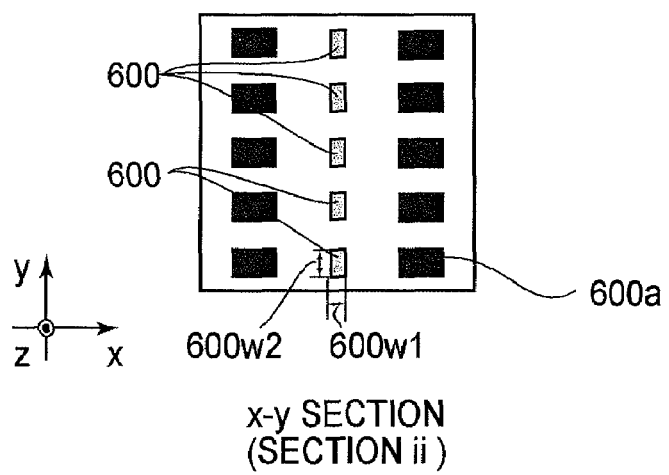
FIG.20C x-y SECTION (SECTION ii)

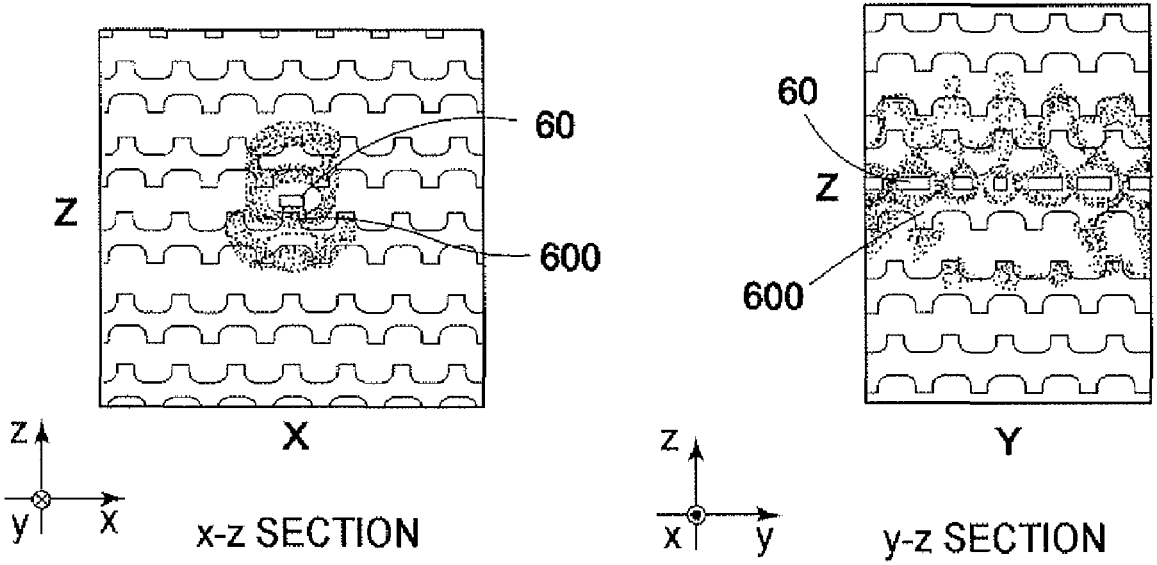
FIG.21A   FIG.21B
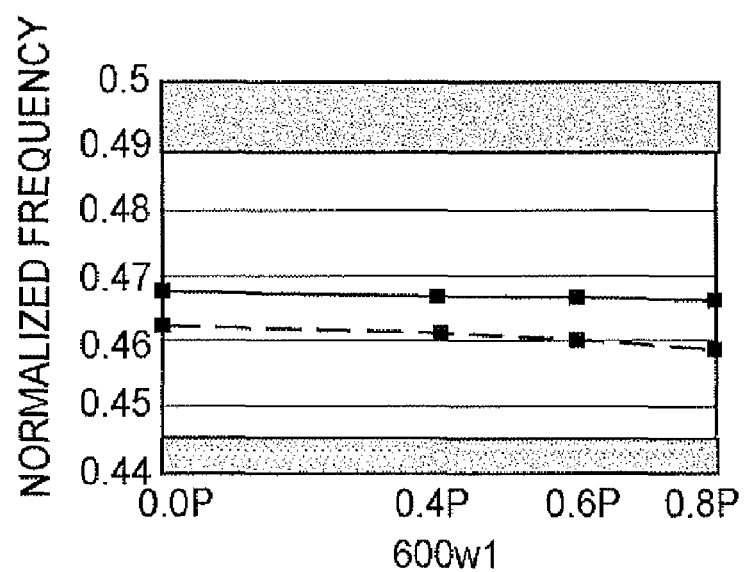
FIG.21C

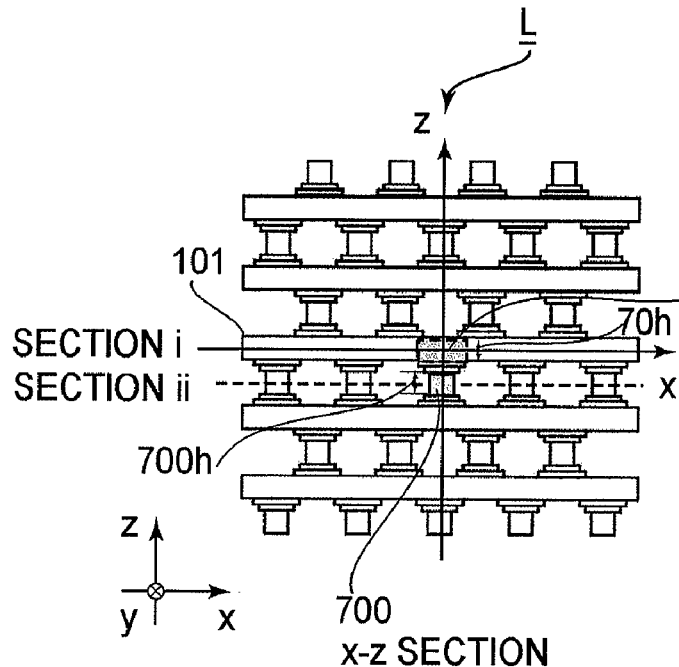
FIG.22A x-z SECTION
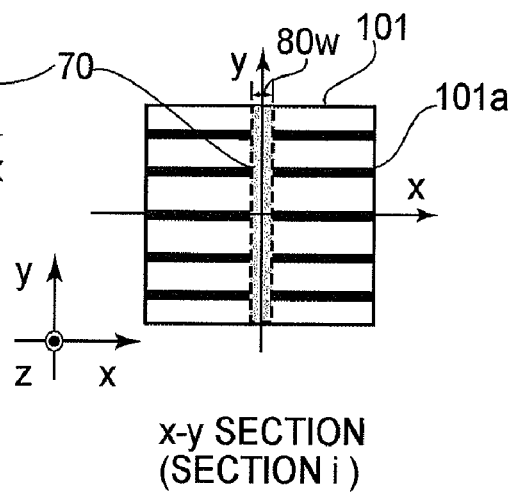
FIG.22B x-y SECTION (SECTION i)
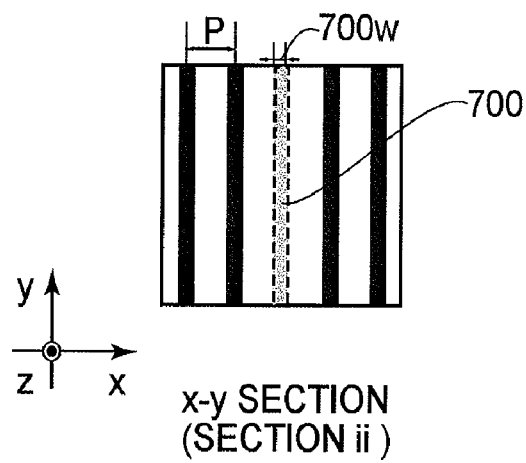
FIG.22C x-y SECTION (SECTION ii)

x-z SECTION(SECTION i)

WAVEGUIDE AND LIGHT EMITTING DEVICE HAVING THE SAME

FIELD OF THE INVENTION AND RELATED ART

This invention relates to a waveguide using a three-dimensional photonic crystal and a light emitting device having the same.

It is known that the transmission/reflection characteristic of electromagnetic waves can be controlled by periodically arranging a structure not larger than the wavelength (Physical Review Letters, Vol. 58, pp. 2059, 1987). When such structural period is of an order of wavelength of light, the transmission/reflection characteristic of light can be controlled. Such a structure is known as photonic crystal, and it is suggested that a mirror having about 100% reflectivity in a certain wavelength band can be realized. The wavelength band in which the reflectivity can be made very high by such microstructure is called "photonic band gap" (PBG), in comparison with the energy gap that conventional semiconductors have.

Furthermore, if a three-dimensional minute periodic structure is used, a photonic band gap can be accomplished with respect to light incident from any direction. This is called "complete photonic band gap". Optical elements having unique facility can be realized by utilizing such complete photonic band gap. For example, when a spotted or line period-defect member is provided in the photonic crystal, it will function as a resonator or a waveguide. Particularly, if a line defect member is adequately provided, a steeply bending waveguide or an optical coupling/decoupling (optical demultiplexer/multiplexer) waveguide can be realized while firmly confining the light in the line defect (Japanese Laid-Open Patent Application No. 2001-74955, or The 65th Lecture of Japan Society of Applied Physics, lecture proceedings, No. 3, pp 936).

Structures of three-dimensional photonic crystal that provide a complete photonic band gap are shown in FIG. 29A-FIG. 29F. These are a diamond opal structure, a woodpile structure, a helical structure, a unique three-dimensional periodic structure, an inverse structure of three-dimensional periodic structure, a diamond woodpile structure.

If a waveguide is made by using a complete photonic band gap, generally, with respect to light of a certain frequency in the PBG, a frequency band for wave-guiding in a single mode and a frequency band for wave-guiding in plural modes coexist. The single mode refers to a mode which, among wave-guiding modes of the waveguide, carries out the wave-guiding while a single wave number vector is present with respect to light of a single frequency. Where the waveguide is used in an optical circuit or a light emitting element, it is desirable that the wave-guiding is carried out in the single mode within the frequency band used with the optical circuit or light emitting element.

On the other hand, each wave-guiding mode of the waveguide using the photonic crystal has a peculiar field strength distribution in the waveguide. When light is taken outwardly from the waveguide end, preferably there should be a field strength distribution with unimodality (single peak) having good symmetry in the section perpendicular to wave-guiding direction. Thus, it is desirable that the wave-guiding mode has a field strength distribution being heavily concentrated in a predetermined region and having unimodality in a plane perpendicular to the wave-guiding direction.

In Japanese Laid-Open Patent Application No. 2001-74955, the waveguide structure is formed by removing a portion of a woodpile structure. However, since the wave-guiding is carried out by plural modes in some frequency band of PBG, the band available for the single mode is limited. Furthermore, if the three-dimensional photonic crystal is comprised of a low refractive index medium, PBG becomes narrower and the frequency band available for the single mode becomes narrowed much more.

The 65th Lecture of Japan Society of Applied Physics, Lecture Proceedings, No. 3, pp 936, shows a waveguide structure which is formed by a line defect member made inside a woodpile structure and a columnar structure added into a layer adjoining the line defect member. In such waveguide structure, the field strength distribution in a plane perpendicular to the wave-guiding direction of the wave-guiding mode and the field strength distribution in a plane parallel to the wave-guiding direction and the lamination direction, are such as shown in FIG. 30A and FIG. 30B. Note here that the lower tone regions in the central portion of the diagram depict stronger field strength regions. As shown in FIG. 30A, the field strength distribution has a dual-peak distribution being heavily concentrated to the added columnar structure portions. This is unfavorable from the standpoint of application. Furthermore, as shown in FIG. 30B, the field strength distribution changes largely within the waveguide. When such waveguide structure and another resonator structure or waveguide structure are put together, if the structural relative position changes due to any manufacturing errors, the positional relationship of the field strength distribution will be largely shifted to cause serious degradation of the propagation characteristic of the electric field between these structures. Thus, in order to obtain desired performance in a device using this waveguide structure, these structures must be positioned very precisely. High manufacturing techniques are required for that.

SUMMARY OF THE INVENTION

The present invention provides a waveguide using a three dimensions photonic crystal, which has a single mode and a field strength distribution with unimodality in a plane perpendicular to the wave-guiding direction, and which enables wave-guiding in a desired frequency band. The present invention further provides a light emitting element having such waveguide.

In accordance with an aspect of the present invention, there is provided a waveguide, comprising: a three-dimensional photonic crystal having a plurality of line defect members, wherein said three-dimensional photonic crystal includes a first layer in which a plurality of columnar structures are arrayed with a spacing, a second layer in which a plurality of columnar structures extending in a direction perpendicular to a direction along which the columnar structures of the first layer extend are arrayed with a spacing, a third layer in which a plurality of columnar structures extending in the same direction as the columnar structures of the first layer are arrayed with a spacing, and a fourth layer in which a plurality of columnar structures extending in the same direction as the columnar structures of the second layer are arrayed with a spacing, wherein the columnar structures of the first and third layers are mutually deviated by a half of the spacing in a direction perpendicular to the direction in which the columnar structures extend, while the columnar structures of the second and fourth layers are mutually deviated by a half of the spacing in a direction perpendicular to the direction in which the columnar structures extend, wherein the line defect members include a first line defect member made of a medium having a refractive index not smaller than that of the columnar structures and formed in a direction perpendicular to the direction in which the columnar structures extend, and a second line defect member formed in the same direction as the first line defect member.

In accordance with another aspect of the present invention, there is provided light emitting device, comprising: a waveguide as recited above; and a resonator based on a point defect member of said three-dimensional photonic crystal, wherein light from said resonator is wave-guided by said waveguide.

In accordance with a further aspect of the present invention, there is provided a light emitting device, comprising: a waveguide as recited above; and exciting means, wherein the first line defect member and the second line defect member of said waveguide include an active medium, and wherein said exciting means is configured to excite the active medium.

In accordance with a yet further aspect of the present invention, there is provided an optical coupling and decoupling circuit, comprising: a waveguide as recited above; and a resonator based on a point defect member of said three-dimensional photonic crystal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7A-FIG. 7C are diagrams for explaining the wave-guiding mode in a second embodiment of the present invention.

FIG. 8A-FIG. 8C are diagrams for explaining the wave-guiding mode in a third embodiment of the present invention.

FIG. 10A-FIG. 10C are diagrams for explaining the wave-guiding mode in the fourth embodiment of the present invention.

FIG. 15A-FIG. 15C are schematic diagrams for explaining a main portion of the fifth embodiment of the present invention.

FIG. 19A-FIG. 19C are diagrams for explaining the wave-guiding mode in the seventh embodiment of the present invention.

FIG. 20A-FIG. 20C are schematic diagrams for explaining a main portion of the eighth embodiment of the present invention.

FIG. 21A-FIG. 21C are diagrams for explaining the wave-guiding mode in eighth embodiment of the present invention.

FIG. 22A-FIG. 22C are schematic diagrams for explaining a main portion of the ninth embodiment of the present invention.

DESCRIPTION OF THE PREFERRED EMBODIMENTS

Preferred embodiments of the present invention will now be described with reference to the attached drawings.

Embodiment 1

Figure 1:
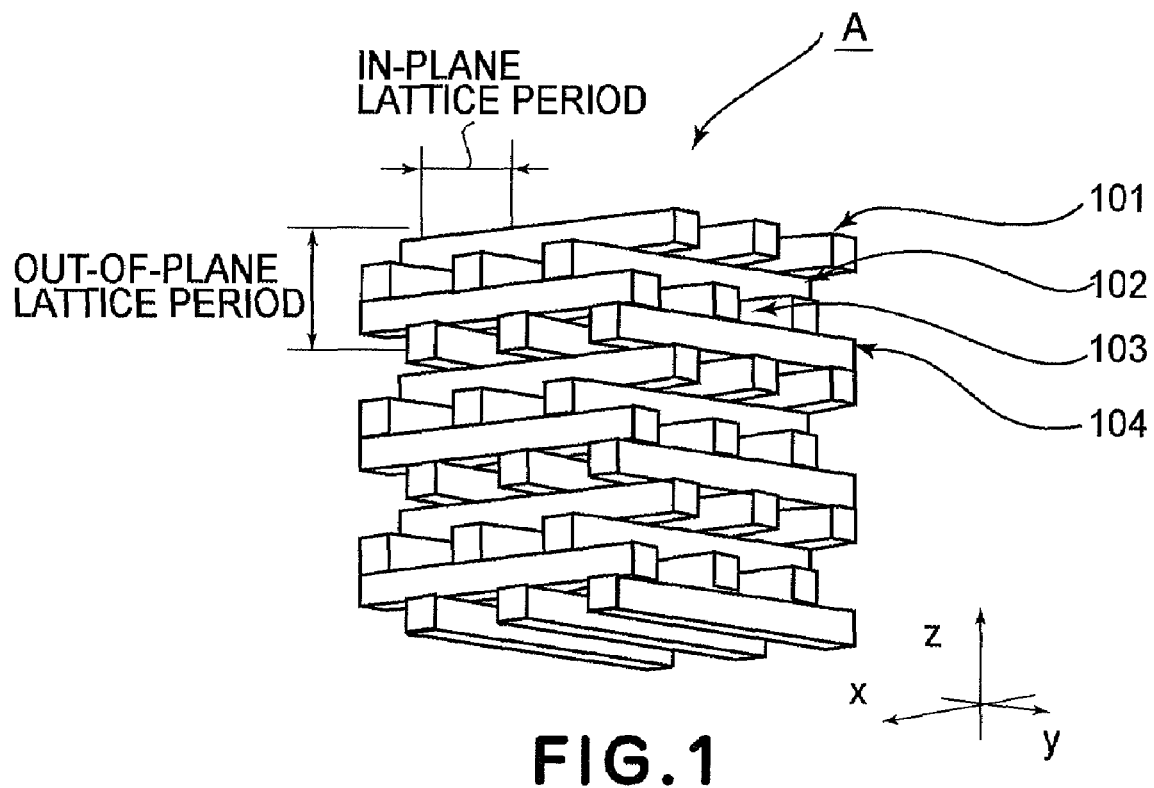
FIG. 1 is a diagram for explaining a woodpile structure.

FIG. 1 is a schematic diagram of a woodpile structure A. The woodpile structure A is constructed to have, as a fundamental period thereof, four layers 101-104 containing the x-y plane.

Figure 2:
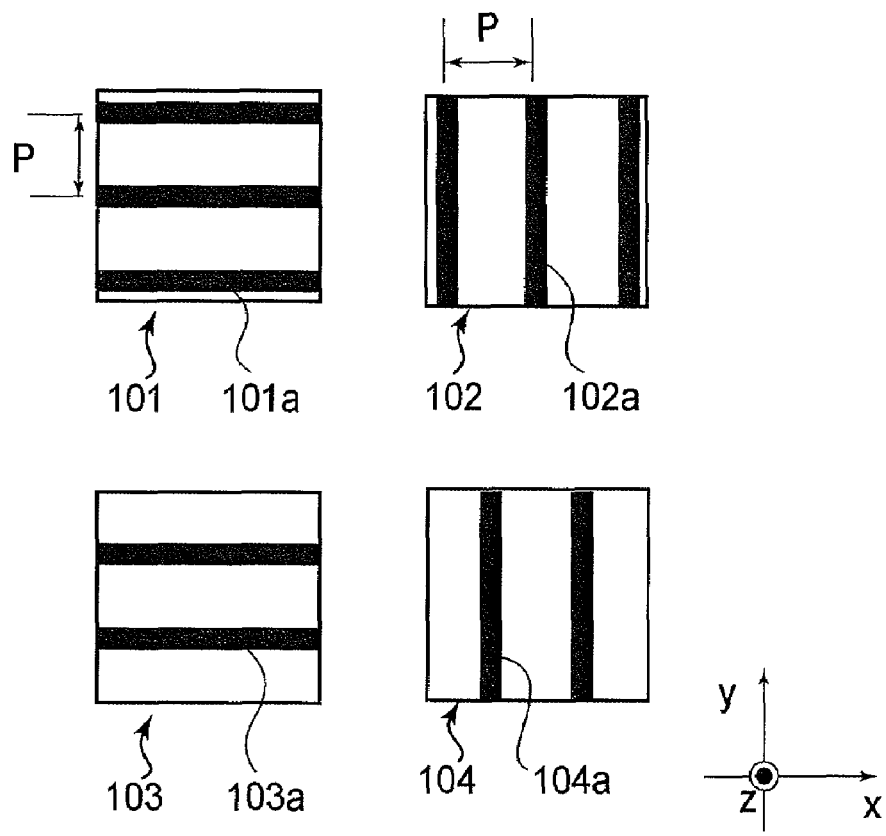
FIG. 2 is a diagram for explaining each layer of the woodpile structure.

FIG. 2 is a schematic diagram of the x-y section of each layer 101-104 of FIG. 1. The first layer 101 and the third layer 103 include plural columnar structures 101a and 103a which extend in the x-axis direction and which are periodically disposed with regular intervals P in the y-axis direction orthogonal to the x-axis direction. The columnar structures 101a and 103a are placed at positions mutually deviated by P/2 in the y-axis direction (i.e. positions deviated by a half of the spacing P of the columnar structures).

Furthermore, the second layer 102 and the fourth layer 104 include plural columnar structures 102a and 104a which extend in the y-axis direction and which are disposed periodically with regular intervals P in the x-axis direction orthogonal to the y-axis direction. The columnar structures 102a and 104a are placed at positions mutually deviated by P/2 in the x-axis direction. In other words, the columnar structure 102a and the columnar structure 104a extend in a direction perpendicular to the columnar structure 101a and the columnar structure 103a.

By optimizing the refractive index of the materials of the columnar structures 101a-104a, the shape and spacing of the columnar structures, the thickness of each layer and so on, a complete photonic band gap can be obtained in a desired frequency band (wavelength region).

The structural parameters of the woodpile structure A to be used in the present embodiment are shown in Table 1 below.

With regard to the structural parameters, in this specification, the in-plane lattice period refers to the spacing P in the period direction in the layers 101a-104a of the columnar structures shown in FIG. 2. Also, the out-of-plane (out-plane) lattice period refers to the fundamental period comprising plural layers. For example, in the woodpile structure A, it corresponds to the length of the four levels of layers 101-104 in the lamination direction (z-axis direction).

Furthermore, the refractive index in Table 1 represents the refractive index of the medium (material) constituting the columnar structures 101a-104a of the woodpile structure. The medium of the portions besides the columnar structure of the woodpile structure is air, and the refractive index is 1.0.

Furthermore, the columnar structure width refers to the length in a direction perpendicular to the direction in which the columnar structure extends in the layer. The columnar structure height refers to the length of the columnar structure in the lamination direction (z-axis direction). This is also the case with the embodiments to be described below.

TABLE 1

| Woodpile Structure A Photonic Crystal Structure | |
| --- | --- |
| Refractive Index | 2.4 |
| In-Plane Lattice Period | P |
| Out-Plane Lattice Period | 1.4P |
| Columnar Structure Width | 0.35P |
| Columnar Structure Height | 0.35P |

Figure 3:
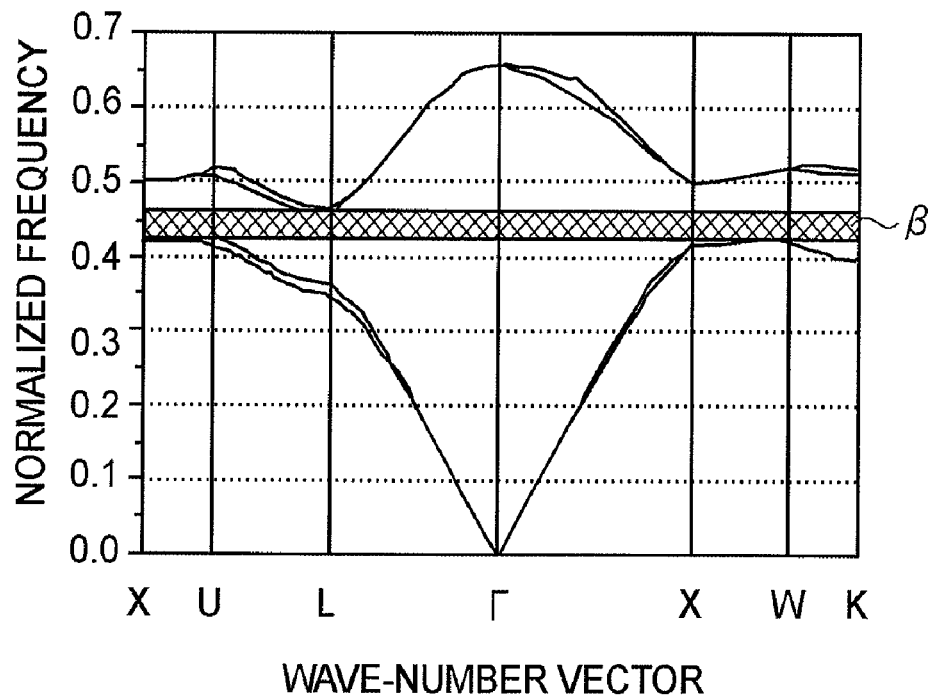
FIG. 3 is a diagram for explaining the normalized frequency of the woodpile structure of FIG. 1.

FIG. 3 is a graph showing the result of calculation of the photonic band gap of the woodpile structure A, made in accordance with the plane wave expansion method. The axis of abscissas of the graph represents the wave vector, that is, the incidence direction of electromagnetic waves incident on the photonic crystal.

For example, point K represents the wave vector parallel to the x-axis (or y-axis), and point X represents the wave vector having a tile of 45 degrees relative to the x-axis (or y-axis) in the x-y plane. The axis of ordinate of the graph represents the frequency (normalized frequency) being standardized with respect to the lattice period. In the domain region β shown by hatching in FIG. 3, a complete photonic band gap where any light cannot be present regardless of the incidence direction of light is defined. If a defect member effective to disturb the period is provided inside such three-dimensional photonic crystal, a defect mode having a frequency within the complete photonic band gap is generated. This defect mode is the mode in which the frequency (wavelength) and the wave vector are fixed based on the shape and medium of the defect member. Here, if a line defect member is provided, since the size of the wave vector is not limited in the direction in which the line defect member extends, the defect mode will be such mode that the wave is guided in the direction in which the line defect member extends.

Figures 4A, 4B:
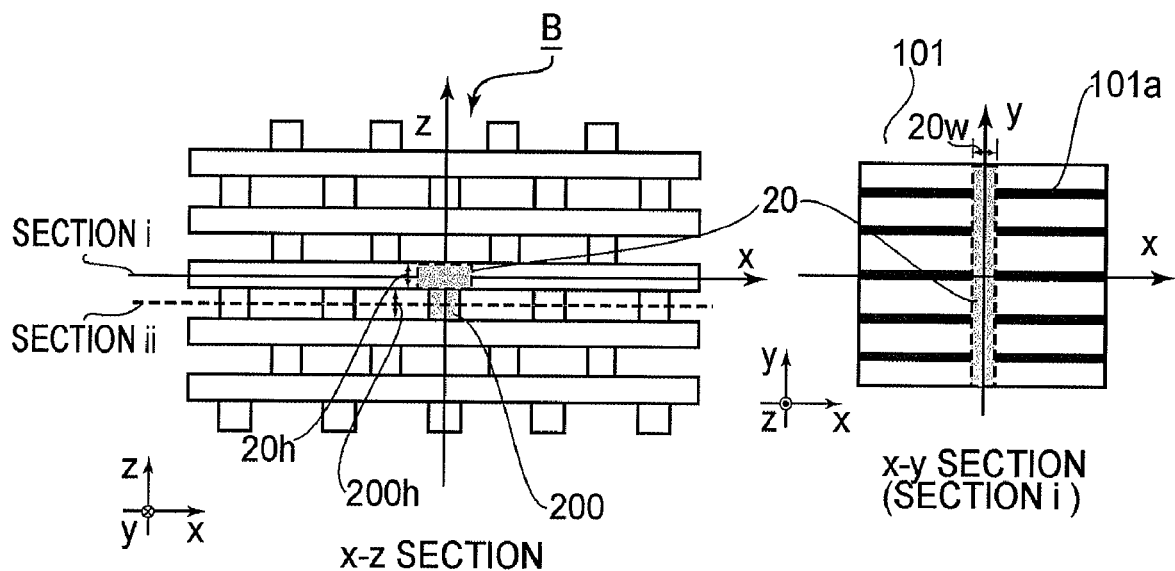
FIG. 4A-FIG. 4C are schematic diagrams for explaining a main portion of a first embodiment of the present invention.
Figure 4C:
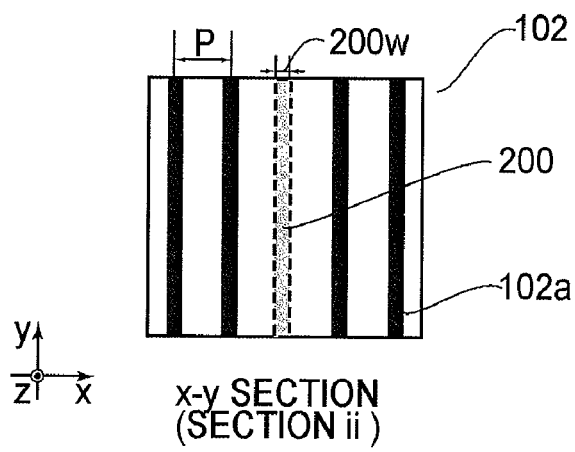

FIG. 4A-FIG. 4C are schematic diagrams of a waveguide structure B in which plural line defect members are provided inside the woodpile structure A. The waveguide structure B includes a line defect member (first line defect member) 20 extending in the y-axis direction, inside the woodpile structure A. The waveguide structure B further includes a second line defect member 200 which is located in a layer different from the layer in which the line defect member 20 is formed. The second line defect member 200 is formed by partly removing the columnar structure 102a extending in the y-axis direction. FIG. 4A is the x-z section of the waveguide structure. FIG. 4B and FIG. 4C are the x-y section of the waveguide structure B.

The present embodiment concerns an example of the structure that includes a first line defect member 20 extending in the y-axis direction and having a width 0.60P, and a second line defect member 200 being formed by removing a portion of the columnar structure extending in the y-axis direction. The first line defect member 20 has a columnar shape, in the first layer 101, extending in the y-axis direction which is perpendicular to the x-axis direction in which the first columnar structure 101a extends. It is formed with a medium having the same refractive index as the columnar structure 101a included in the layer 101. The second line defect member 200 is provided by changing, in the second layer 102 (different from the first layer 101), the width of a portion of the columnar structure 102a. Namely, it is provided by changing the shape of the columnar structure 102a. Structural parameters of the waveguide structure B are shown in Table 2.

The origin of coordinate has been set at the center of the first line defect member 20, in the x-z section of FIG. 4A. Furthermore, the length of each defect member in the x-axis direction within the layer is taken as the defect member width. The length of each defect member in the lamination direction (z-axis direction) is taken as the defect member height. The refractive index of the medium constituting each defect member 20 and 200 is taken as the defect member refractive index. In Table 2 and FIG. 4, the defect member width is denoted by 20w and 200w, respectively. The defect member height is denoted by 20h and 200h, respectively, and the defect member refractive index is denoted by 20n.

TABLE 2

| Waveguide Structure B | |
| --- | --- |
| Photonic Crystal Structure | |
| Refractive Index | 2.4 |
| In-Plane Lattice Period | P |
| Out-Plane Lattice Period | 1.4P |
| Columnar Structure Width | 0.35P |
| Columnar Structure Height | 0.35P |
| First Line Defect Member 20 | |
| Center Coordinate (x, z) | (0.00P, 0.00P) |
| Defect Member Refractive Index 20n | 2.4 |
| Defect Member Width 20w | 0.60P |
| Defect Member Height 20h | 0.35P |
| Second Line Defect Member 200 | |
| Center Coordinate (x, z) | (0.00P, −0.35P) |
| Defect Member Width 200w | 0.00P |
| Defect Member Height 200h | 0.35P |

Figure 5A:
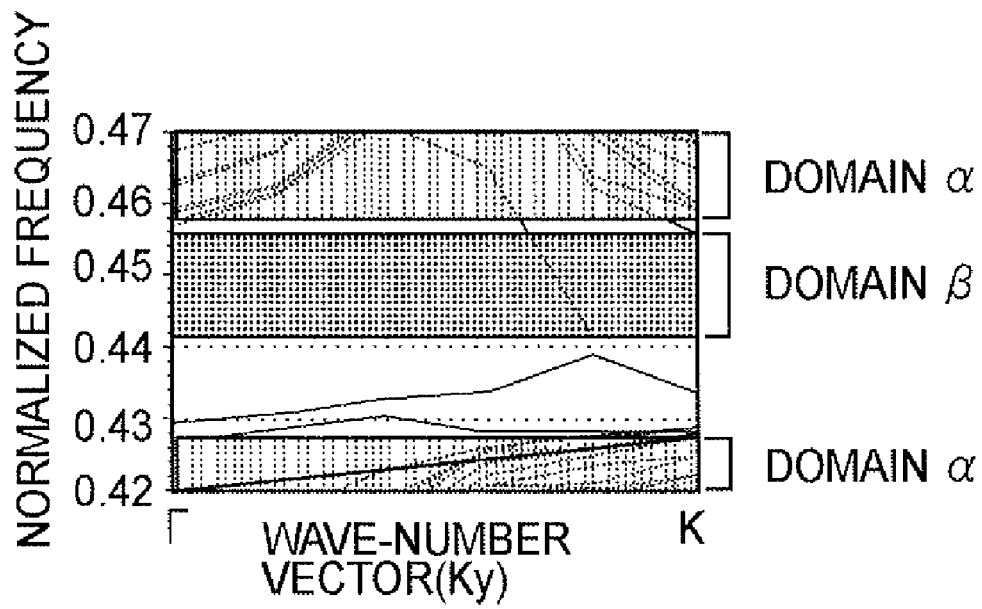
FIG. 5A-5C are diagrams for explaining the wave-guiding mode in the first embodiment of the present invention.

FIG. 5A is a graph showing the result of calculation wherein the plane wave expansion (PWE) method was used to calculate the wave-guiding mode of the waveguide structure B. The axis of abscissas of the graph of FIG. 5A represents the dimension of the component of the wave vector in the wave-guiding direction (y-axis direction), being standardized with respect to the lattice period P. The axis of ordinate of the graph shows the frequency (normalized frequency) standardized with respect to the lattice period P. Furthermore, the frequency band as depicted by the domain region α shows the frequency band other than the complete photonic band gap. The mode existing in the complete photonic band gap represents a defect mode due to the defect member. Furthermore, the frequency band shown in the domain region β is the frequency band that enables wave-guiding by the single mode, among the defect modes.

Figures 5B, 5C:
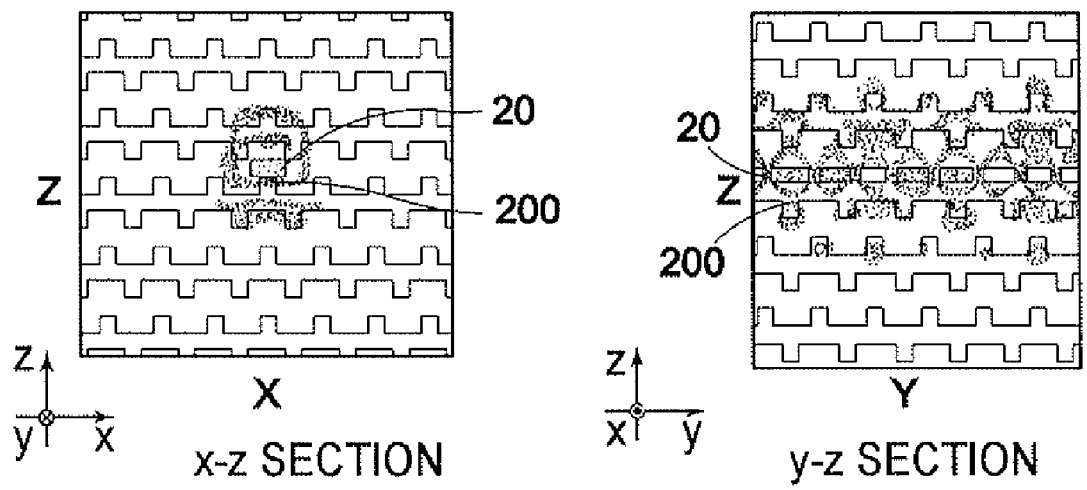

FIG. 5B and FIG. 5C show the results of calculation made for the waveguide structure B on the basis of the finite difference time domain (FDTD) method, with regard to the field strength distribution in the x-z section and y-z section of the wave-guiding mode in the frequency band that provides single-mode wave-guiding. In FIG. 5B and FIG. 5C, lower-tone portions depict intense field-strength areas.

As shown in FIG. 5A, the frequency band wherein the wave can be guided by the single mode exists in the range of 0.441 to 0.456. If, in the waveguide structure B, the wave-guiding mode where only the first line defect member 20 is provided and the second line defect member 200 is not provided is calculated by using PWE method, then the frequency band that provides single-mode wave-guiding ranges from 0.432 to 0.435. Hence, with the provision of the second line defect member 200, a waveguide that provides single-mode wave-guiding in large frequency band can be obtained. Furthermore, as shown in FIG. 5B and FIG. 5C, the wave-guiding mode has a field strength distribution with unimodality wherein the field strength heavily concentrates in the vicinity of the center of the waveguide.

Figure 6:
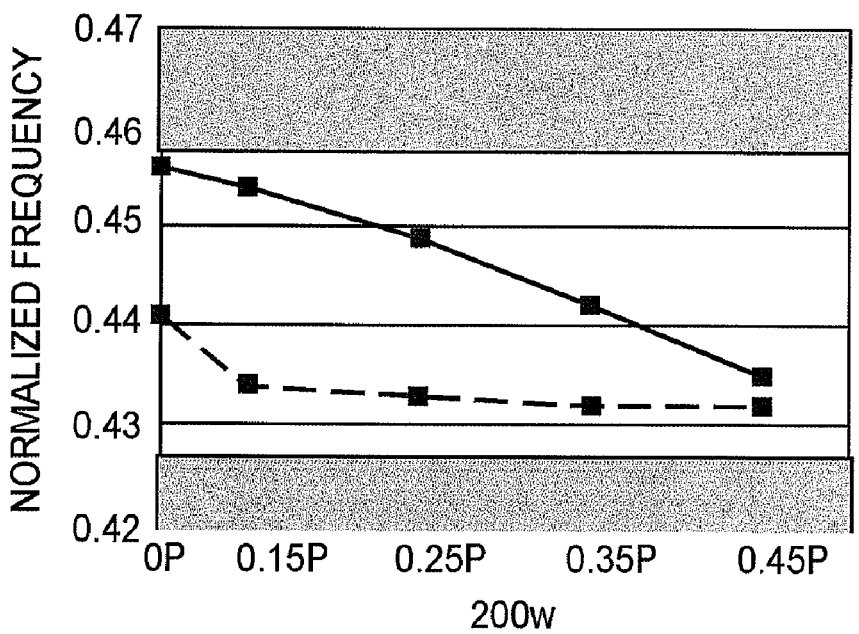
FIG. 6 is a diagram for explaining the normalized frequency in the first embodiment of the present invention.

FIG. 6 shows changes, in the waveguide structure B, of the frequency band that provides single-mode wave-guiding when the defect member width 200w of the second line defect member 200 is changed.

In FIG. 6, the defect member width 200w of the second line defect member 200 is represented in the axis of abscissas, and the normalized frequency is represented in the axis of ordinate. A solid line and a broken line in the drawing, connecting the points in the diagram, represent a high frequency and a low frequency of the frequency band, providing single-mode wave-guiding. As shown in FIG. 6, by changing the defect member width 200w, the frequency band that provides single-mode wave-guiding is changeable.

Thus, in the waveguide structure B, the frequency band that provides single-mode wave-guiding can be controlled by changing the shape of the second line defect member 200.

With the waveguide structure B of the present embodiment, as compared with the conventional waveguide structure, the frequency band that provides single-mode wave-guiding can be controlled, and a mode having an intensity distribution with unimodality can be obtained in the plane (y-z section) which is perpendicular to the wave-guiding direction. The reason will be explained below.

The electrical field distribution of the wave-guiding mode of the waveguide has a property that it is liable to concentrate on a high refractive-index material portion. In the waveguide structure proposed in conventional examples, two line defect members made of a high dielectric material are disposed close to each other, above and below the line defect member formed with a low dielectric material. Therefore, the electrical field distribution of the wave-guiding mode concentrates on the two line defect members made of a high refractive-index material. It concentrates a little on the line defect member which formed between them of a low refractive-index material. Thus, the electrical field distribution in the plane perpendicular to the wave-guiding direction (x-axis direction) would be a distribution with dual peaks.

On the other hand, in the waveguide structure B according to the present embodiment, the first line defect member 20 is made of a high dielectric material (high refraction material). Furthermore, the first line defect member 20 is so disposed that the portions above and below the first line defect member 20 provide regions made of a low refractive-index material. Therefore, the electrical field distribution of the wave-guiding mode is heavily concentrated on the first line defect member 20 made of a high refractive index medium. Thus, the electrical field distribution in the plane (y-z section) perpendicular to the wave-guiding direction will have a distribution with unimodality (single peak) in which it heavily concentrates on the first line defect member 20.

Furthermore, in the wave-guiding mode of the waveguide structure B, when the electric field distribution of the wave-guiding mode wherein the magnitude of the wave-guiding direction component of the wave vector is close to K is compared with the electric field distribution of the waveguide mode which is close to Γ, the electric field distribution of the mode close to K heavily concentrates on the first line defect member 20. On the other hand, as regards the mode which is close to Γ, the electric field distribution spreads up to a point remote from the first line defect member 20. Particularly, it spreads in the lamination direction, relative to the line defect member. Likewise, in the wave-guiding mode of the waveguide structure B, the electric field distribution of the wave-guiding mode which is close to the low frequency side of PBG and the electric field distribution of the wave-guiding mode which is close to the high frequency side of PBG are compared with each other. The electrical field distribution of the wave-guiding mode which is close to the low frequency side of PBG comparatively heavily concentrates on the first line defect member 20. On the other hand, in the wave-guiding mode which is close to the high frequency side of PBG, the electric field distribution spreads to a portion remote from the first line defect member 20. Particularly it is spreading in the lamination direction.

Like the relationship of the frequency and the wave vector of the light which is fixed by the refractive index of the space, the relationship of the frequency and the wave vector of the wave-guiding mode is fixed by the mode refractive index. If the wave vector is constant, the lower the mode refractive index is, the higher the mode frequency is. Furthermore, the mode refractive index is determined by the rate that the electrical field distribution concentrates on the high refractive-index portion of the structure. In consideration of this, the second line defect member 200 is formed in a layer different from the first line defect member 20, and the shape of the second line defect member 200 is changed to locally decrease the refractive index. Based on this, the mode refractive index of the mode in which the magnitude of the wave-guiding direction component of the wave vector of the wave-guiding mode is near to Γ as well as the mode refractive index of the mode in which it is near the high frequency side of PBG, will decrease and the frequency of these modes will change toward the high frequency side. As a result of this, the frequency band that provides single-mode wave-guiding can be expanded and the frequency with which single-mode wave-guiding is enabled can be controlled.

Although, in this embodiment, the second line defect member 200 is formed in the layer including a columnar structure which extends in the same direction as the first line defect member 20 and it is provided at the columnar structure located nearest to the first line defect member 20, the second line defect member may be provided in any other columnar structure. For example, the second line defect member may be provided in a layer adjoining the first line defect member and at the columnar structure which is located farther remote therefrom. Similar advantageous results will be provided. Furthermore, the second line defect member may be provided at a columnar structure which is located in layer further remote from the first line defect member in the lamination direction. Similar advantageous results will be provided by that.

The length of a line connecting the first line defect member 20 and the second line defect member 200 in a plane (y-z section) perpendicular to the wave-guiding direction may effectively be made equal to or less than the out-plane lattice period. Furthermore, the number of columnar structures whereat the second line defect member 200 is to be provided is not limited to the example of the present embodiment. It may be even lower than 3 or more than 5. Furthermore, when plural line defect members are provided, these line defect members may have different shapes. By controlling the position, number and shape of the second line defect member finely, the frequency of the wave-guiding mode can be controlled more precisely.

Embodiment 2

A second embodiment of the present invention concerns a waveguide structure C in which the refractive index of the medium constituting the columnar structure is made different from to the waveguide structure B of the first embodiment. Structural parameters of the waveguide structure C are shown in Table 3 below.

TABLE 3

| Waveguide Structure C | |
|---|---|
| Photonic Crystal Structure | |
| Refractive Index | 3.6 |
| In-Plane Lattice Period | P |
| Out-Plane Lattice Period | 1.2P |
| Columnar Structure Width | 0.30P |
| Columnar Structure Height | 0.30P |
| First Line Defect Member 20 | |
| Center Coordinate (x, z) | (0.00P, 0.00P) |
| Defect Member Refractive Index 20n | 3.6 |
| Defect Member Width 20w | 0.60P |
| Defect Member Height 20h | 0.30P |
| Second Line Defect Member 200 | |
| Center Coordinate (x, z) | (0.00P, −0.30P) |
| Defect Member Width 200w | 0.10P |
| Defect Member Height 200h | 0.30P |

FIG. 7A and FIG. 7B show the field strength distribution in x-z section and y-z section of the wave-guiding mode in the frequency band that provides single-mode wave-guiding, in the waveguide structure C. In FIG. 7A and FIG. 7B, the lower-tone regions depict higher field strength areas. Furthermore, FIG. 7C shows changes of the frequency band that provides single-mode wave-guiding, in the waveguide structure C, when the defect member width 200w of the second line defect member 200 is changed. In FIG. 7C, the defect member width 200w is depicted on the axis of abscissas, and the normalized frequency is depicted on the axis of ordinate. Furthermore, a solid line and a broken line in the drawing that connect the points in the diagram depict the high frequency and low frequency of the respective frequency bands that provide single-mode wave-guiding. Note that the wave-guiding mode was calculated using the PWE method, and the electric field distribution of the wave-guiding mode was based on the FDTD method.

As shown in FIG. 7A and FIG. 7B, the wave-guiding mode has an electric field distribution of approximately unimodal shape in which the field strength heavily concentrates in the vicinity of the center of the waveguide. Furthermore, as shown in FIG. 7C, the frequency band that provides single-mode wave-guiding when the width 200w of the second line defect member 200 is 0.10 P, is present in the range from 0.338 to 0.364. In the waveguide structure C, if the wave-guiding mode in a case where only the first line defect member 20 is provided and no second line defect member is used is calculated on the basis of PWE method, the frequency band that provides single-mode wave-guiding ranges from 0.336 to 0.343. In this manner, with the provision of the second line defect member 200, a waveguide which enables wave-guiding in a single mode in a large frequency band is obtained. Furthermore, as shown in FIG. 7C, by changing defect member width 200w, the region providing the single-mode wave-guiding is changed. Hence, a waveguide having a wave-guiding mode in which the electric field distribution heavily concentrates in the vicinity of the center of the waveguide is obtainable regardless of the refractive index of the medium constituting the three-dimensional photonic crystal structure. Moreover, based on the shape of the second line defect member 200, the band for enabling single-mode wave-guiding can be controlled.

Embodiment 3

A third embodiment of the present invention concerns a waveguide structure D in which, as compared with the waveguide structure B of the first embodiment, the first line defect member 20 is made of a medium having a refractive index not less than the refractive index of the medium of the columnar structure. Structure parameters of the waveguide structure D are shown in Table 4.

TABLE 4

| Waveguide Structure D | |
|---|---|
| Photonic Crystal Structure | |
| Refractive Index | 2.4 |
| In-Plane Lattice Period | P |
| Out-Plane Lattice Period | 1.4P |
| Columnar Structure Width | 0.35P |
| Columnar Structure Height | 0.35P |
| First Line Defect Member 20 | |
| Center Coordinate (x, z) | (0.00P, 0.00P) |
| Defect Member Refractive Index 20n | 2.6 |
| Defect Member Width 20w | 0.60P |
| Defect Member Height 20h | 0.35P |
| Second Line Defect Member 200 | |
| Center Coordinate (x, z) | (0.00P, −0.35P) |
| Defect Member Width 200w | 0.00P to 0.35P |
| Defect Member Height 200h | 0.35P |

FIG. 8A and FIG. 8B show the field strength distribution in x-z section and y-z section of the wave-guiding mode in the frequency band that provides single-mode wave-guiding, in the waveguide structure D. In FIG. 8A and FIG. 8B, the lower-tone regions depict higher field strength areas. Furthermore, FIG. 8C shows changes of the frequency band that provides single-mode wave-guiding, in the waveguide structure D, when the defect member width 200w is changed. In FIG. 8C, the defect member width 200w is depicted on the axis of abscissas, and the normalized frequency is depicted on the axis of ordinate. Furthermore, a solid line and a broken line in the drawing that connect the points in the diagram depict the high frequency and low frequency of the respective frequency bands that provide single-mode wave-guiding.

Note that the wave-guiding mode was calculated using the PWE method, and the electric field distribution of the wave-guiding mode was based on the FDTD method.

As shown in FIG. 8A and FIG. 8B, the wave-guiding mode has an electric field distribution of approximately unimodal shape in which the field strength heavily concentrates in the vicinity of the center of the waveguide. Furthermore, as shown in FIG. 8C, by changing the defect member width 200w of the second line defect member 200, the region providing the single-mode wave-guiding is changed. Hence, a waveguide having a wave-guiding mode in which the electric field distribution heavily concentrates in the vicinity of the center of the waveguide is obtainable even when the first line defect member is made of a medium having a refractive index larger than that of the medium that constitutes the three-dimensional photonic crystal. Furthermore, with the provision of the second line defect member 200 and by changing the shape thereof, the band for enabling single-mode wave-guiding can be controlled.

Embodiment 4

FIG. 9 is a schematic diagram of a main portion of a waveguide structure E according to a fourth embodiment.

The second line defect member 300 is made of a medium having a refractive index different from the refractive index of the medium constituting the columnar structure included in the same layer as the second line defect member 300. With this waveguide structure E, a wave-guiding mode in which the electrical field distribution is heavily concentrated in the waveguide center is provided. Furthermore, by changing the refractive index of the second line defect member 300, the frequency band that provides single-mode wave-guiding can be controlled.

Figures 9A, 9B:
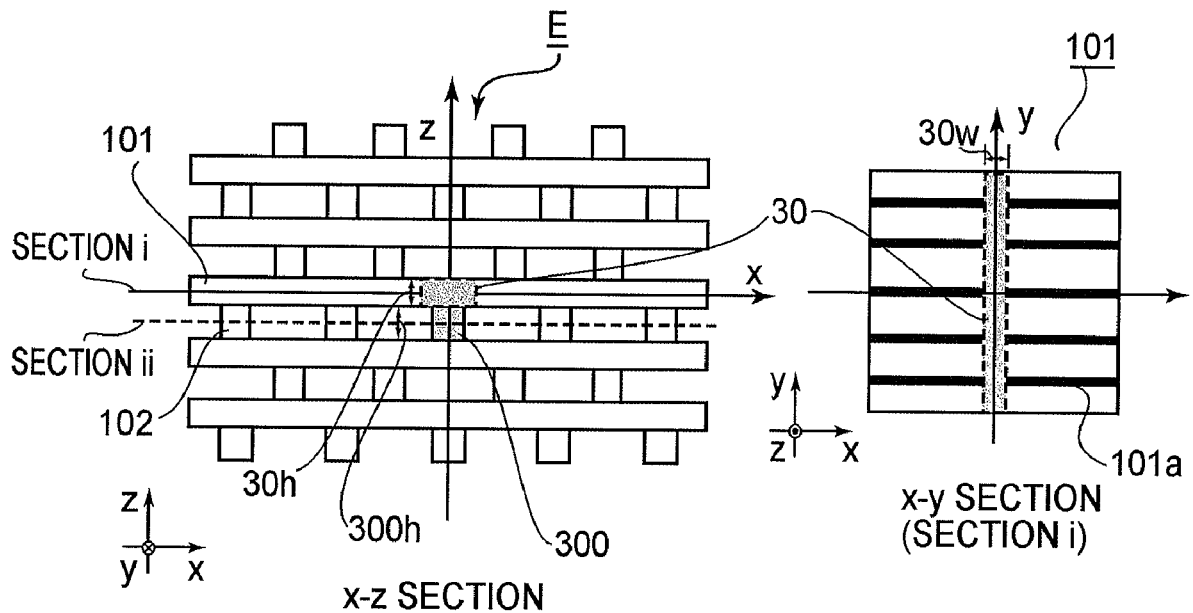
FIG. 9A-FIG. 9C are schematic diagrams for explaining a main portion of a fourth embodiment of the present invention.
Figure 9C:
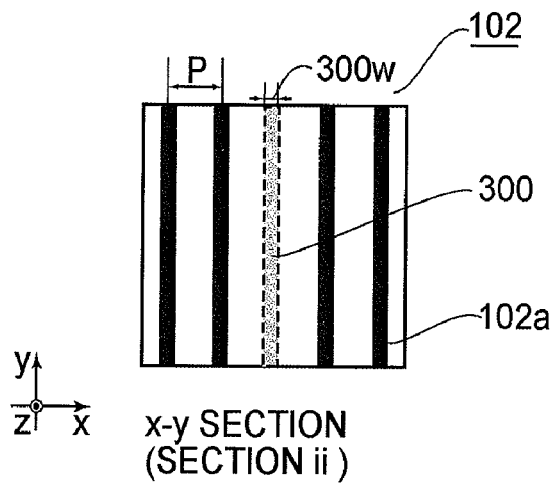

The waveguide structure E has a first line defect member 30 extending in the y-axis direction and a second line defect member 300 which is provided in a layer different from the first line defect member 30 and is formed in a portion of a columnar structure 102a extending in the y-axis direction, the first and second line defect members being provided inside the woodpile structure A. The first line defect member 30 has a columnar shape in the first layer 101. It is made of a medium having the same refractive index as the columnar structure 101a, constituting the photonic crystal structure A. The second line defect member 300 is provided in the second layer 102 by forming a portion of the columnar structure 102a by use of a medium having a refractive index different from the medium constituting the columnar structure of the woodpile structure A. FIG. 9B and FIG. 9C are x-y sectional views of the layers of the waveguide structure E.

The present embodiment concerns a structure that includes a first line defect member 30 having a width 0.60P and a second line defect member 300 provided by forming a portion of a columnar structure extending in the y-axis direction by use of a medium having a refractive index 1.7. Note that the length of each defect member in the x-axis direction within the layer is taken as the defect member width. The length of each defect member in the lamination direction (z-axis direction) is taken as the defect member height. The refractive index of the medium constituting each defect member 20 and 200 is taken as the defect member refractive index. In FIG. 9 and Table 5, the defect member width is denoted by 30w and 300w, respectively. The defect member height is denoted by 30h and 300h, respectively, and the refractive indices of the media constituting the line defect members are denoted by 30n and 300n.

TABLE 5

| Waveguide Structure E | |
|---|---|
| Photonic Crystal Structure | |
| Refractive Index | 2.4 |
| In-Plane Lattice Period | P |
| Out-Plane Lattice Period | 1.4P |
| Columnar Structure Width | 0.35P |
| Columnar Structure Height | 0.35P |
| First Line Defect Member 30 | |
| Center Coordinate (x, z) | (0.00P, 0.00P) |
| Defect Member Refractive Index 30n | 2.4 |
| Defect Member Width 30w | 0.60P |
| Defect Member Height 30h | 0.35P |
| Second Line Defect Member 300 | |
| Center Coordinate (x, z) | (0.00P, −0.35P) |
| Defect Member Refractive Index 300n | 1.7 |
| Defect Member Width 300w | 0.35P |
| Defect Member Height 300h | 0.35P |

FIG. 10A is a graph showing the result of calculation wherein the plane wave expansion (PWE) method was used to calculate the wave-guiding mode of the waveguide structure E. The axis of abscissas and the axis of ordinate in the graph of FIG. 10A are the same as FIG. 5A. Like FIG. 5A, the frequency band of the domain region α depicted by vertical hatching represents the frequency band other than the complete photonic band gap. Furthermore, the frequency band shown in the domain region β is the frequency band that enables wave-guiding by the single mode, among the waveguide modes.

FIG. 10B and FIG. 10C show the field strength distribution in the x-z section and y-z section of the wave-guiding mode in the frequency band that provides single-mode wave-guiding. In FIG. 10B and FIG. 10C, lower-tone portions depict intense field-strength areas. The field strength distribution of the waveguide mode was calculated based on the FDTD method.

As shown in FIG. 10A, the frequency band wherein the wave can be guided by the single mode exists in the range of 0.433 to 0.451. If, in the waveguide structure E, the wave-guiding mode where only the first line defect member 30 is provided and the second line defect member 300 is not provided is calculated by using PWE method, then the frequency band that provides single-mode wave-guiding ranges from 0.432 to 0.435. Hence, with the provision of the second line defect member 300, a waveguide that provides single-mode wave-guiding in large frequency band can be obtained. Furthermore, as shown in FIG. 10B and FIG. 10C, the wave-guiding mode has a field strength distribution with unimodality wherein the field strength heavily concentrates in the vicinity of the center of the waveguide.

Figure 11:
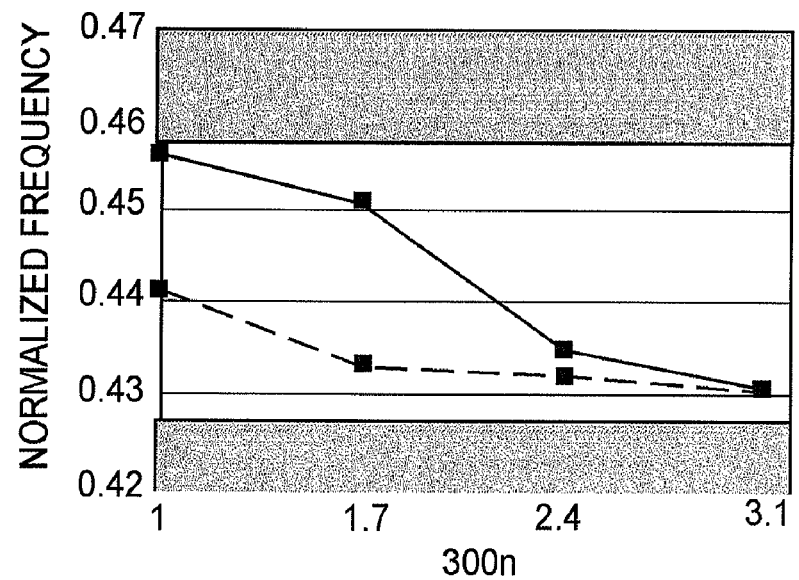
FIG. 11 is a diagram for explaining the wave-guiding mode in the fourth embodiment of the present invention.

FIG. 11 shows changes, in the waveguide structure E, of the frequency band that provides single-mode wave-guiding when the defect member refractive index 300n of the second line defect member 300 is changed.

In FIG. 11, the defect member refractive index 300n is represented in the axis of abscissas, and the normalized frequency is represented in the axis of ordinate. A solid line and a broken line in the drawing, connecting the points in the diagram, represent a high frequency and a low frequency of the frequency band, providing single-mode wave-guiding. As illustrated, by changing the refractive index 300n of the second defect member 300 in the waveguide structure E, the frequency band that provides single-mode wave-guiding is changeable.

Thus, with the waveguide structure E of the present embodiment, the frequency band that provides single-mode wave-guiding can be controlled, and a mode having an intensity distribution of approximately unimodal shape can be obtained in the plane (y-z section) which is perpendicular to the wave-guiding direction. The reason therefor is the same as has been described with reference to the first embodiment.

Furthermore, in the present embodiment, like the waveguide structure B, it is not influenced by the refractive index of the medium of the columnar structure, constituting the photonic crystal. Thus, regardless of the refractive index of the medium forming the three-dimensional photonic crystal structure, the band that provides single-mode wave-guiding can be controlled on the basis of the defect member refractive index 300n of the second line defect member 300.

As described, the foregoing embodiments have been explained with reference to examples in which a waveguide structure is provided in the woodpile structure. In addition to this, with these embodiments, it has been clarified that, by this waveguide structure, waves can be guided in the single mode and a mode having a desired intensity distribution.

Note that the electrical field distribution of the wave-guiding mode has a property that it is liable to concentrate on a high dielectric medium. Therefore, if the second line defect member is provided near the first line defect member, the electric field distribution of the wave-guiding mode is affected by the second line defect member. In consideration of this, it is desirable that the position, shape and medium of the second line defect member should preferably be determined, relative to the first line defect member, to provide good symmetry in the plane of lamination or with respect to the lamination direction.

Furthermore, the electrical field distribution of the wave-guiding mode described with reference to the present embodiment heavily concentrates on the first line defect member. Therefore, the frequency band that provides single-mode wave-guiding can be controlled by changing the shape of the first line defect member 30 as well. By appropriately determining the shape and medium of the first line defect member as well as the position, shape and medium of the second line defect member, in a desired frequency band, a waveguide for single-mode wave-guiding can be accomplished.

For the medium constituting the waveguide structure using a three-dimensional photonic crystal such as described above, it is desirable to use more than two kinds media having high refractive index ratio, like the conventional structure. As regards the medium for constituting a columnar structure, a high refractive index material such as Si, GaAs, InP, Ge, $TiO_2$, GaN, $Ta_2O_5$ or $Nb_2O_5$, for example, is preferable. A material being transparent and having no absorption in the used wavelength band is more preferable. The medium except the medium for constituting the columnar structure may be a dielectric material such as $SiO_2$, a high polymer molecule organic material such as PMMA, or a low refractive index media such as air or water. Because the photonic band gap is provided based on the refractive index distribution in the crystal, a wider photonic band gap can be obtained if media having larger mutual refractive index ratio are used. In order to obtain a photonic band gap having an effective extent, the refractive index ratio should preferably be not less than 2. Furthermore, as regards the medium constituting the first line defect member which is made of a high refractive index medium, a high refractive index medium such as described above is desirable. Furthermore, in the second line defect member, the columnar structure may have the same shape or, alternatively, the shape may be changed and the refractive index may be changed as well. Furthermore, the waveguide can be made by using conventional manufacture techniques (e.g., a method of repeating the structure patterning based on electron beam lithography and the lamination process, a wafer fusing method or a nanoimprint method).

Embodiment 5

Figure 12:
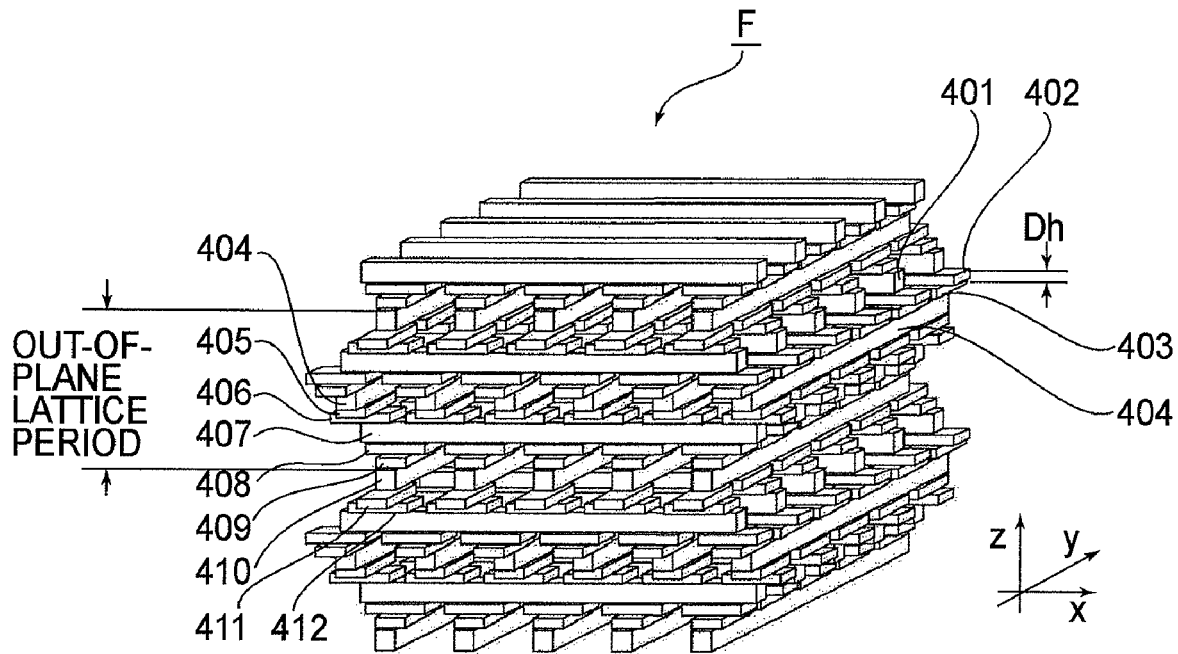
FIG. 12 is a diagram for explaining a three-dimensional photonic crystal in accordance with fifth to tenth embodiments of the present invention.

FIG. 12 is a schematic diagram of a main portion of a three dimensions photonic crystal structure F having a photonic band gap wider than that of the woodpile structure A.

The three-dimensional woodpile structure F is constructed to have, as a fundamental period thereof, twelve layers 401-412 containing the x-y plane. FIG. 12 shows a portion of each layer 401-412 in x-y section. The first layer 401 and the seventh layer 407 include plural columnar structures 401a and 407a which extend in the x-axis direction and which are periodically disposed with regular intervals P in the y-axis direction. The columnar structures 401a and 407a are placed at positions mutually deviated by P/2 in the y-axis direction.

Furthermore, the fourth layer 404 and the tenth layer 410 include plural columnar structures 404a and 410a which extend in the y-axis direction and which are disposed periodically with regular intervals P in the x-axis direction. The columnar structures 404a and 410a are placed at positions mutually deviated by P/2 in the x-axis direction.

In the second layer 402 and the third layer 403, there are discrete structures 402a and 403a which are disposed at positions corresponding to the points of intersection of the columnar structure 401a of the first layer 401 and the columnar structure 404a of the fourth layer 404. These discrete structures 402a and 403a are placed discretely so as not to contact each other in the x-y plane.

The discrete structures 402a and 403a have such symmetry that they are superposed one upon another when rotated by 90 degrees in the x-y plane. This is also the case with the fifth layer 405, sixth layer 406, eighth layer 408, ninth layer 409, eleventh layer 411 and twelfth layer 412, sandwiched between layers including the columnar structures. Namely, discrete structures 405a, 406a, 408a, 409a, 411a, 412a are disposed discretely along the x-y plane, at positions corresponding to the intersection points of columnar structures in adjoining layer.

The columnar structure and discrete structure in each layer are in contact each other. A wide complete photonic band gap can be obtained in a desired frequency band (wavelength band) by optimizing the refractive index of the materials of the columnar structure and the discrete structure as well as the shape, the spacing and spacing of the discrete structure and each layer thickness.

The second, third, fifth, sixth, eighth, ninth, eleventh and twelfth layers are added supplement layers including discrete structures.

Structural parameters of the three-dimensional photonic crystal structure F are shown in Table 6. In this specification, the in-plane lattice period refers to the spacing P of the columnar structures shown in FIG. 13. Also, the out-of-plane (out-plane) lattice period refers to the fundamental period comprising plural layers. For example, in the three-dimensional photonic crystal structure F, it corresponds to the length of the twelve levels of layers 401-412 in the lamination direction. Furthermore, the refractive index in Table 6 represents the refractive index of the medium constituting the columnar structures and the discrete structures of the three-dimensional photonic crystal structure F. The medium of the portions besides the columnar structures and the discrete structures of the three-dimensional photonic crystal structure F is air, and the refractive index is 1.0.

Figure 13:
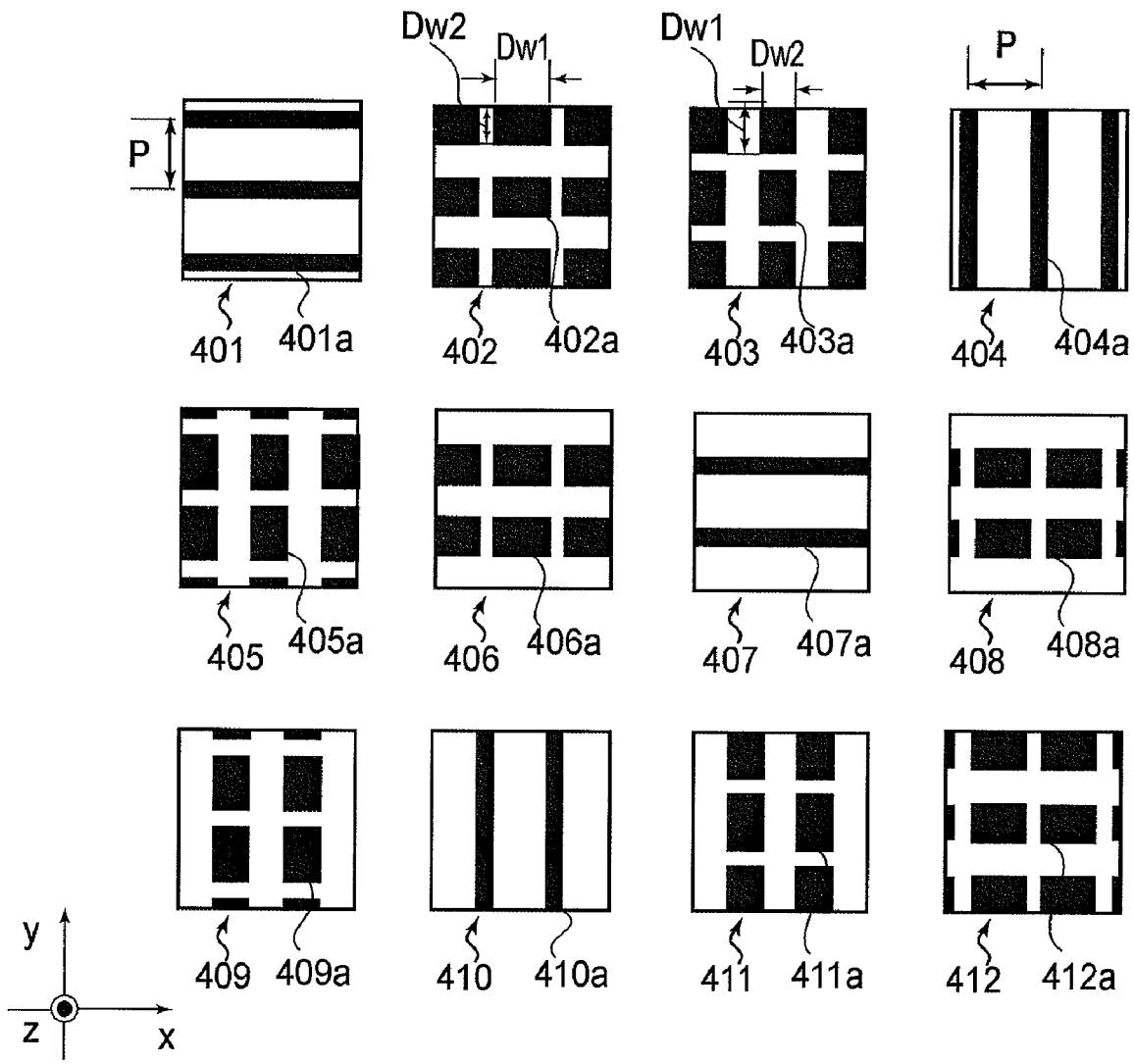
FIG. 13 is a diagram for explaining each layer of a three-dimensional photonic crystal in accordance with the fifth to tenth embodiments of the present invention.

Furthermore, the discrete structure width refers to the length of each discrete structure in the layer shown in FIG. 13. This is represented by Dw1 and Dw2 in Table 6 and FIG. 13.

Furthermore, the discrete structure height refers to the length of each discrete structure in the lamination direction (z-axis direction). This is represented by Dh in Table 6 and FIG. 13.

TABLE 6

Three-Dimensional Photonic Crystal Structure F
Photonic Crystal Structure

| | |
|---|---|
| Refractive Index | 2.4 |
| In-Plane Lattice Period | P |
| Out-Plane Lattice Period | 1.4P |
| Columnar Structure Width | 0.30P |
| Columnar Structure Height | 0.25P |
| Discrete Structure Width Dw1 | 0.60P |
| Discrete Structure Width Dw2 | 0.40P |
| Discrete Structure Height Dh | 0.05P |

Figure 14:
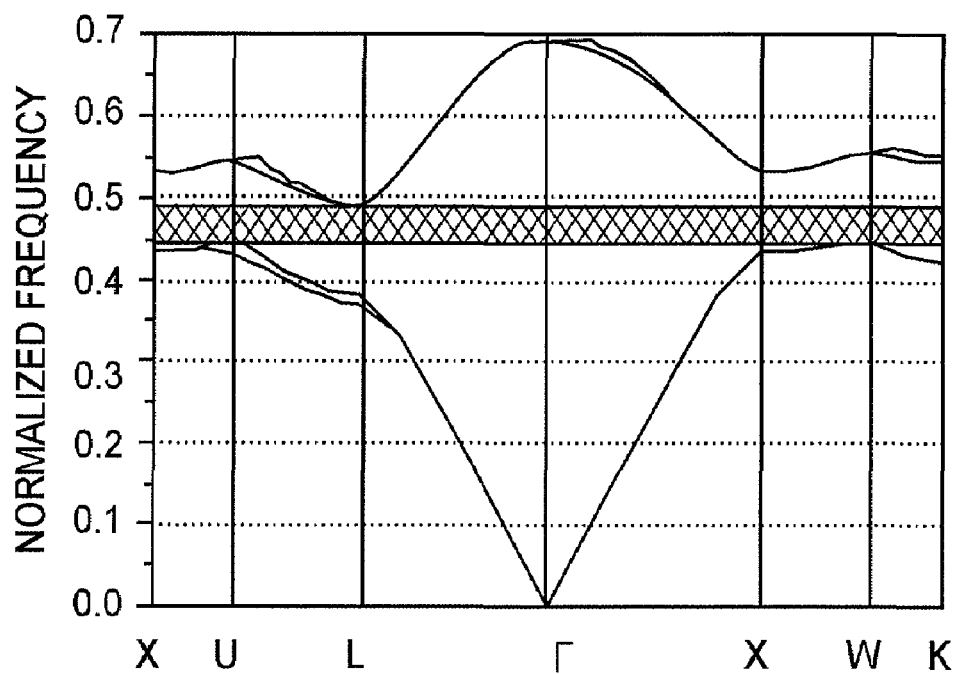
FIG. 14 is a diagram for explaining the normalized frequency of the three-dimensional photonic crystal in accordance with the fifth to tenth embodiments of the present invention.

FIG. 14 is a graph showing the result of calculation of the photonic band gap of the three-dimensional photonic crystal structure F, made in accordance with the plane wave expansion method.

The axis of abscissas and the axis of ordinate of the graph are the same as FIG. 3 of the first embodiment. In the wavelength domain region shown by hatching, a complete photonic band gap where any light cannot be present regardless of the incidence direction of light is defined. If a defect member of line shape is provided inside the three-dimensional photonic crystal F, like the case of the woodpile structure of the first embodiment, a waveguide mode having a frequency within the complete photonic band gap is generated.

FIG. 15A-FIG. 15C are schematic diagrams of a waveguide structure G in which line defect members 50 and 500 are provided inside the three-dimensional photonic crystal structure F. The waveguide structure G in FIG. 15A-FIG. 15C includes a first line defect member 50 extending in the y-axis direction, inside the three-dimensional photonic crystal structure F. The waveguide structure G further includes a second line defect member 500 which is located in a layer different from the layer in which the first line defect member 50 is formed. The second line defect member 500 is formed by deforming a portion of the columnar structure extending in the y-axis direction.

The first line defect member 50 has a width 0.60P, and it is a region made of a medium having the same refractive index as the medium that constitutes the columnar structure included in the same as the first line defect member 50. This is also the case with a first line defect member 60 of FIG. 20, a first line defect member 70 of FIG. 22, and a first line defect member 80 of FIG. 25, to be described below.

FIG. 15A is an x-z sectional view of the waveguide structure G. FIG. 15B and FIG. 15C are x-y sectional views of the waveguide structure G. The present embodiment shows a structural example including a first line defect member 50 extending in the y-axis direction and having a width 0.60P and a second line defect member 500 extending in the y-axis direction and having a columnar structure with a width 0.00 P. Structural parameters of the waveguide structure G are shown in Table 7 below.

Here, the defect member width refers to the length of each defect member in the x-axis direction, within the layer. It is represented by 50w and 500w in Table 7 and FIG. 15B and FIG. 15C. Furthermore, the defect member height refers to the length of each defect member in the lamination direction (z-axis direction). It is represented by 50h and 500h, in Table 7 and FIG. 15A. Furthermore, the defect member refractive index refers to the refractive index of the medium constituting each defect member, and it is represented by 50n in Table 7.

Note that the origin of the coordinate is taken at the center of the first line defect member 50, in the x-z section of FIG. 15A.

TABLE 7

Waveguide Structure G

| | |
|---|---|
| Photonic Crystal Structure F | |
| Refractive Index | 2.4 |
| In-Plane Lattice Period | P |
| Out-Plane Lattice Period | 1.4P |
| Columnar Structure Width | 0.30P |
| Columnar Structure Height | 0.25P |
| Discrete Structure Width Dw1 | 0.60P |
| Discrete Structure Width Dw2 | 0.40P |
| Discrete Structure Height Dh | 0.05P |
| First Line Defect Member 50 | |
| Center Coordinate (x, z) | (0.00P, 0.00P) |
| Defect Member Refractive Index 50n | 2.4 |
| Defect Member Width 50w | 0.60P |
| Defect Member Height 50h | 0.25P |
| Second Line Defect Member 500 | |
| Center Coordinate (x, z) | (0.00P, −0.35P) |
| Defect Member Width 500w | 0.00P |
| Defect Member Height 500h | 0.25P |

Figure 16A:
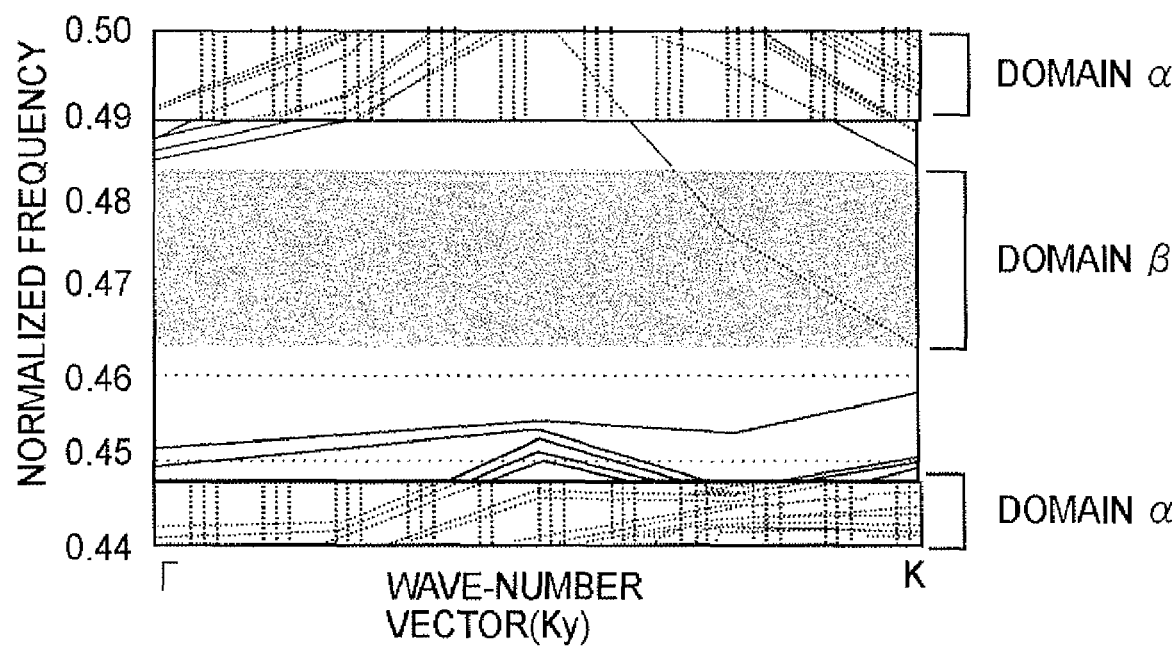
FIG. 16A-FIG. 16C are diagrams for explaining the wave-guiding mode in the fifth embodiment of the present invention.

FIG. 16A is a graph showing the result of calculation wherein the plane wave expansion (PWE) method was used to calculate the wave-guiding mode of the waveguide structure G. The axis of abscissas and the axis of ordinate in the graph of FIG. 16A are the same as FIG. 5A of the first embodiment.

Like the first embodiment, the frequency band of the domain region α depicted by vertical hatching represents the frequency band other than the complete photonic band gap. Furthermore, the frequency band shown in the domain region β of FIG. 16A is the frequency band that enables waveguiding by the single mode, among the waveguide modes.

Figures 16B, 16C:
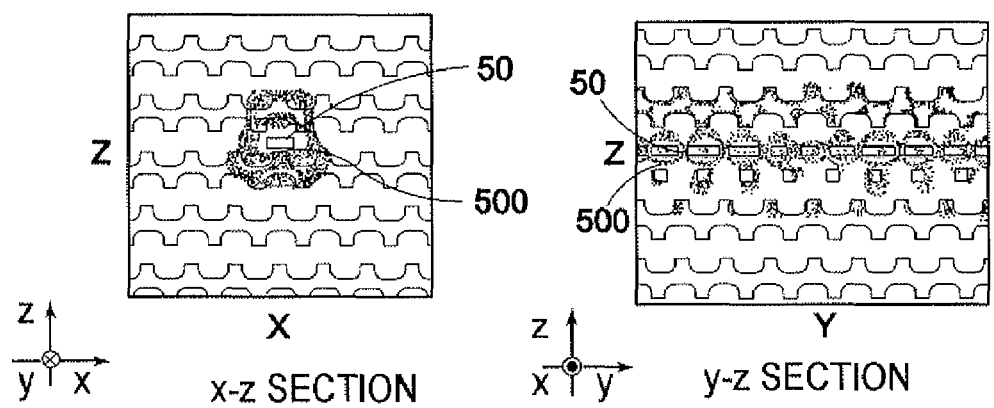

FIG. 16B and FIG. 16C show the field strength distribution of the wave-guiding mode in the frequency band that provides single-mode wave-guiding, in the waveguide structure G. The field strength distribution was calculated based on the FDTD method. In FIG. 16B and FIG. 16C, the field strength distribution is illustrated with respect to the x-z section and y-z section of the waveguide structure G. In FIG. 10B and FIG. 10C, lower-tone portions depict intense field-strength areas.

As shown in FIG. 16A, the frequency band wherein the wave can be guided by the single mode exists in the range of 0.462 to 0.478. If, in the waveguide structure G, the wave-guiding mode where only the first line defect member 50 is provided and the second line defect member 500 is not provided is calculated by using PWE method, then the frequency band that provides single-mode wave-guiding ranges from 0.460 to 0.467. Hence, with the provision of the second line defect member 500, a waveguide that provides single-mode wave-guiding in large frequency band can be obtained. Furthermore, as shown in FIG. 16B and FIG. 16C, the wave-guiding mode has a field strength distribution with unimodality wherein the field strength heavily concentrates in the vicinity of the center of the waveguide.

Figure 17:
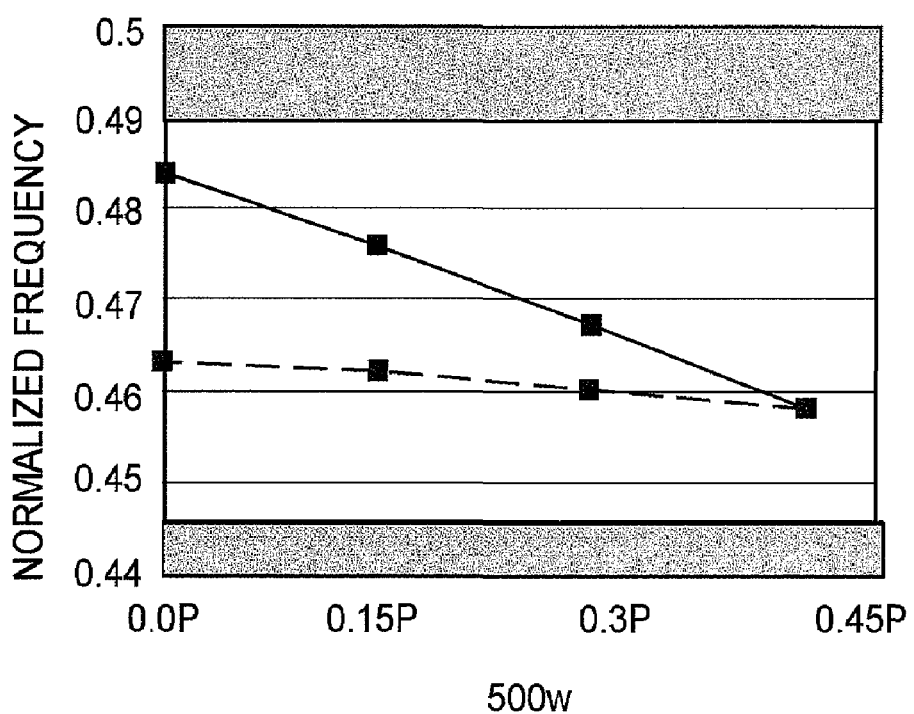
FIG. 17 is a diagram for explaining the wave-guiding mode in the fifth embodiment of the present invention.

FIG. 17 shows changes, in the waveguide structure G, of the frequency band that provides single-mode wave-guiding when the defect member width 500w of the second line defect member 500 is changed. In FIG. 17, the defect member width is taken on the axis of abscissas, and the normalized frequency is taken on the axis of ordinate. A solid line and a broken line in the drawing, connecting the points in the diagram, represent a high frequency and a low frequency of the frequency band, providing single-mode wave-guiding. As illustrated in FIG. 17, by changing the defect member width 500w, the frequency domain that provides single-mode wave-guiding is changeable. Thus, with the waveguide structure G of the present embodiment, the frequency band that provides single-mode wave-guiding can be controlled by changing the shape of the second line defect member 500 formed in a portion of the columnar structure which is provided in a layer different from the layer in which the first line defect member 50 is formed.

Thus, with the waveguide structure G of the present embodiment, the frequency band that provides single-mode wave-guiding can be controlled, and an intensity distribution of approximately unimodal shape can be obtained in the plane perpendicular to the wave-guiding direction. The reason therefor is the same having been described with reference to the first embodiment.

In this embodiment, the waveguide structure includes a first line defect member and a second line defect member provided at a columnar structure which adjoins the first line defect member. In this embodiment, however, the second line defect member may be provided in a layer adjoining the first line defect member and at the columnar structure which is located farther remote therefrom. Similar advantageous results will be provided. Furthermore, the second line defect member may be provided at a columnar structure which is located in layer further remote from the first line defect member in the lamination direction. Similar advantageous results will be provided by that.

The length of a line connecting the first line defect member and the second line defect member in the lamination direction may effectively be made equal to or less than the out-plane lattice period. Furthermore, the number of the second line defect members is not limited to the example of this embodiment. Furthermore, when plural line defect members are provided, these line defect members may have different shapes.

Embodiment 6

A sixth embodiment concerns a waveguide structure H having a refractive index different from the waveguide structure G. Structural parameters of the waveguide structure H are shown in Table 8 below.

TABLE 8

Waveguide Structure H

Photonic Crystal Structure F

| | |
|---|---|
| Refractive Index | 3.6 |
| In-Plane Lattice Period | P |
| Out-Plane Lattice Period | 1.4P |
| Columnar Structure Width | 0.25P |
| Columnar Structure Height | 0.25P |
| Discrete Structure Width Dw1 | 0.60P |
| Discrete Structure Width Dw2 | 0.40P |
| Discrete Structure Height Dh | 0.05P |

First Line Defect Member 50

| | |
|---|---|
| Center Coordinate (x, z) | (0.00P, 0.00P) |
| Defect Member Refractive Index 50n | 3.6 |

TABLE 8-continued

Waveguide Structure H

| | |
|---|---|
| Defect Member Width 50w | 0.60P |
| Defect Member Height 50h | 0.45P |

Second Line Defect Member 500

| | |
|---|---|
| Center Coordinate (x, z) | (0.00P, −0.35P) |
| Defect Member Width 500w | 0.00P |
| Defect Member Height 500h | 0.25P |

Figures 18A, 18B:
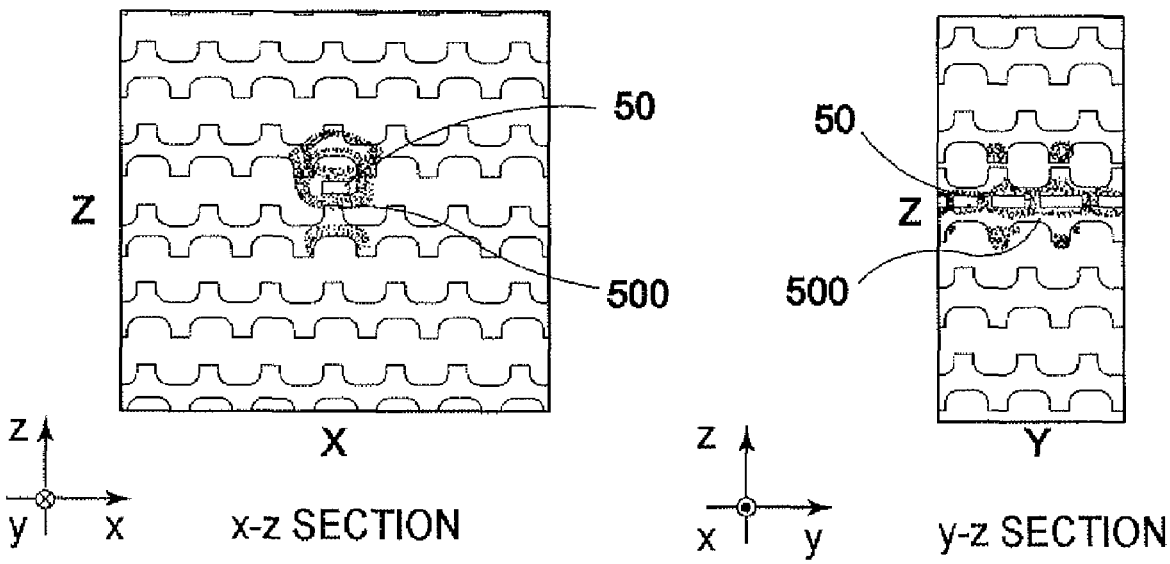
FIG. 18A-FIG. 18C are diagrams for explaining the wave-guiding mode in the sixth embodiment of the present invention.
Figure 18C:
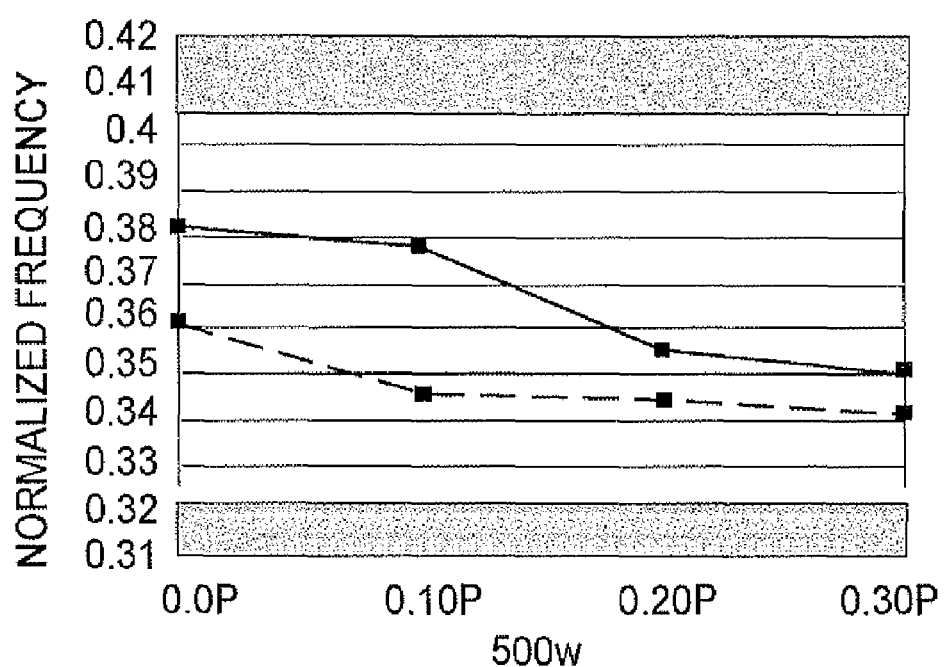

FIG. 18A and FIG. 18B show the field strength distribution in x-z section and y-z section of the wave-guiding mode in the frequency band that provides single-mode wave-guiding, in the waveguide structure H. In FIG. 18A and FIG. 18B, the lower-tone regions depict higher field strength areas. Furthermore, FIG. 18C shows changes of the frequency band that provides single-mode wave-guiding, in the waveguide structure H, when the defect member width 500w of the second line defect member is changed. In FIG. 18C, the defect member width is depicted on the axis of abscissas, and the normalized frequency is depicted on the axis of ordinate. Furthermore, a solid line and a broken line in the drawing that connect the points in the diagram depict the high frequency and low frequency of the respective frequency bands that provide single-mode wave-guiding. Note that the wave-guiding mode was calculated using the PWE method, and the electric field distribution of the wave-guiding mode was based on the FDTD method.

As shown in FIG. 18A and FIG. 18B, the wave-guiding mode has an electric field distribution of approximately unimodal shape in which the field strength heavily concentrates in the vicinity of the center of the waveguide. Furthermore, as shown in FIG. 18C, by changing the defect member width 500w, the region providing the single-mode wave-guiding is changed. Hence, a waveguide having a wave-guiding mode in which the electric field distribution heavily concentrates in the vicinity of the center of the waveguide is obtainable, regardless of the refractive index of the medium constituting the three-dimensional photonic crystal structure. Furthermore, by changing the shape of the second line defect member 500, the band for enabling single-mode wave-guiding can be controlled.

Embodiment 7

A seventh embodiment concerns a waveguide structure I wherein the refractive index of a first line defect member is made higher than that of the waveguide structure G. Structural parameters of the waveguide structure I are shown in Table 9 below.

TABLE 9

Waveguide Structure I

Photonic Crystal Structure F

| | |
|---|---|
| Refractive Index | 2.4 |
| In-Plane Lattice Period | P |
| Out-Plane Lattice Period | 1.4P |
| Columnar Structure Width | 0.30P |
| Columnar Structure Height | 0.25P |
| Discrete Structure Width Dw1 | 0.60P |
| Discrete Structure Width Dw2 | 0.40P |
| Discrete Structure Height Dh | 0.05P |

TABLE 9-continued

Waveguide Structure I

First Line Defect Member 50

| | |
|---|---|
| Center Coordinate (x, z) | (0.00P, 0.00P) |
| Defect Member Refractive Index 50n | 2.6 |
| Defect Member Width 50w | 0.60P |
| Defect Member Height 50h | 0.25P |
| Second Line Defect Member 500 | |
| Center Coordinate (x, z) | (0.00P, −0.35P) |
| Defect Member Width 500w | 0.00P to 0.30P |
| Defect Member Height 500h | 0.25P |

FIG. 19A and FIG. 19B show the field strength distribution in x-z section and y-z section of the wave-guiding mode in the frequency band that provides single-mode wave-guiding, in the waveguide structure I. In FIG. 19A and FIG. 19B, the lower-tone regions depict higher field strength areas. Furthermore, FIG. 19C shows changes of the frequency band that provides single-mode wave-guiding, in the waveguide structure I, when the defect member width 500w is changed. In FIG. 19C, the defect member width is depicted on the axis of abscissas, and the normalized frequency is depicted on the axis of ordinate. Furthermore, a solid line and a broken line in the drawing that connect the points in the diagram depict the high frequency and low frequency of the respective frequency bands that provide single-mode wave-guiding. Note that the wave-guiding mode was calculated using the PWE method, and the electric field distribution of the wave-guiding mode was based on the FDTD method.

As shown in FIG. 19A and FIG. 19B, the wave-guiding mode has an electric field distribution of approximately unimodal shape in which the field strength heavily concentrates in the vicinity of the center of the waveguide. Furthermore, as shown in FIG. 19C, by changing the defect member width 500w, the region providing the single-mode wave-guiding is changed. Hence, a waveguide having a wave-guiding mode in which the electric field distribution heavily concentrates in the vicinity of the center of the waveguide is obtainable even when the first line defect member 50 is made of a medium having a refractive index larger than that of the medium that constitutes the three-dimensional photonic crystal. Furthermore, with the provision of the second line defect member 500 and by changing the shape thereof, the band for enabling single-mode wave-guiding can be controlled.

Embodiment 8

FIG. 20 is a schematic diagram a main portion of an eighth embodiment of the present invention. The eighth embodiment concerns a waveguide structure J which, in the three-dimensional photonic crystal structure F, comprises a second line defect member 600 provided in a discrete structure 600a arranged in the same direction as the direction in which the first line defect member 60 extends. With this waveguide structure J, a waveguide having a wave-guiding mode in which an electrical field distribution heavily concentrates at the waveguide center is obtained. Furthermore, by changing the shape of the discrete structure 600a, the frequency band that provides single-mode wave-guiding can be controlled.

The waveguide structure J includes a first line defect member 60 extending in the y-axis direction and provided inside the three-dimensional photonic crystal structure F. Furthermore, the waveguide structure includes a second line defect member 600 which is disposed in a layer different from the layer in which the first line defect member 60 is formed and which is provided by deforming a portion of the discrete structure 600a.

FIG. 20A is an x-z sectional view of the waveguide structure J, and FIG. 20B and FIG. 20C are x-y sectional views. In this embodiment, in the layer shown in FIG. 20C (which is equivalent to the second layer 402 of FIG. 13), the width in the x-axis direction of the discrete structure 600a adjacent to the first line defect member 60 is changed to define the second line defect member 600.

Structural parameters of the waveguide structure J are shown in Table 9. Here, the defect member width refers to the length of each defect member in the layer, as illustrated. In Table 10 and FIG. 20A, the length of the x-axis direction is represented by 60w and 600w1, and the length thereof in the y-axis direction is represented by 600w2. Furthermore, the defect member height refers to the length of each defect member in the lamination direction (z-axis direction). In Table 10 and FIG. 20A, it is represented by 60h and 600h. Furthermore, the defect member refractive index refers to the refractive index of the medium constituting each defect member 60 and 600, and it is represented by 60n in Table 10.

TABLE 10

Waveguide Structure J

Photonic Crystal Structure F

| | |
|---|---|
| Refractive Index | 2.4 |
| In-Plane Lattice Period | P |
| Out-Plane Lattice Period | 1.4P |
| Columnar Structure Width | 0.30P |
| Columnar Structure Height | 0.25P |
| Discrete Structure Width Dw1 | 0.60P |
| Discrete Structure Width Dw2 | 0.40P |
| Discrete Structure Height Dh | 0.05P |
| First Line Defect Member 60 | |
| Center Coordinate (x, z) | (0.00P, 0.00P) |
| Defect Member Refractive Index 60n | 2.4 |
| Defect Member Width 60w | 0.60P |
| Defect Member Height 60h | 0.25P |
| Second Line Defect Member 600 | |
| Center Coordinate (x, z) | (0.00P, −0.15P) |
| Defect Member Width 600w1 | 0.00P to 0.80P |
| Defect Member Width 600w2 | 0.60P |
| Defect Member Height 600h | 0.05P |

FIG. 21A and FIG. 21B show the field strength distribution in x-z section and y-z section of the wave-guiding mode in the frequency band that provides single-mode wave-guiding, in the waveguide structure J. In FIG. 21A and FIG. 21B, the lower-tone regions depict higher field strength areas. Furthermore, FIG. 21C shows changes of the frequency band that provides single-mode wave-guiding, in the waveguide structure J, when the defect member width 600w1 is changed. In FIG. 21C, the defect member width 600w1 is depicted on the axis of abscissas, and the normalized frequency is depicted on the axis of ordinate. Furthermore, a solid line and a broken line in the drawing that connect the points in the diagram depict the high frequency and low frequency of the respective frequency bands that provide single-mode wave-guiding. Note that the wave-guiding mode was calculated using the PWE method, and the electric field distribution of the wave-guiding mode was based on the FDTD method.

As shown in FIG. 21A and FIG. 21B, the wave-guiding mode has an electric field distribution of approximately unimodal shape in which the field strength heavily concentrates in the vicinity of the center of the waveguide. Furthermore, as shown in FIG. 21C, by changing the defect member width 600w1, the region providing the single-mode wave-guiding is changed. Hence, in the waveguide structure J, the second line defect member 600 may be provided at the discrete structure 600a disposed at a position different from the first line defect member 60, and it may be formed by changing the length of the discrete structure 600a in the x-axis direction. With this arrangement, a waveguide having a wave-guiding mode in which the electric field distribution heavily concentrates in the vicinity of the center of the waveguide is obtainable. Furthermore, by changing the shape of the discrete structure 600a formed as the second line defect member 600, the band for enabling single-mode wave-guiding can be controlled.

Although in this embodiment the length of the discrete structure 600a in the x-axis direction is changed to provide the second line defect member 600, similar advantageous results are obtainable when the length in the y-axis direction is changed.

Embodiment 9

FIG. 22A-FIG. 22C are schematic diagrams of a main portion of a waveguide structure L according to a ninth embodiment.

The second line defect member 700 of the waveguide structure L is formed in a portion of a columnar structure 700a extending in the same direction as a first line defect member 700, and it is made of a medium having a refractive index different from the refractive index of the columnar structure 700a. With this waveguide structure L, a wave-guiding mode in which the electrical field distribution is heavily concentrated in the waveguide center is provided. Furthermore, by changing the refractive index of the second line defect member 700, the frequency band that provides single-mode wave-guiding can be controlled.

The waveguide structure L shown in FIG. 22A-FIG. 22C has a first line defect member 70 extending in the y-axis direction and a second line defect member 700 which is provided in a layer different from the first line defect member 70 and is formed in a portion of a columnar structure 700a extending in the y-axis direction, the first and second line defect members being provided inside the three-dimensional photonic crystal structure F. The first line defect member 70 has a line shape in the first layer 101 and extends in the y-axis direction. It is made of a medium having the same refractive index as the medium of the columnar structure 101a included in the first layer 101. The second line defect member 700 is made by forming a portion of the columnar structure 700a by use of a medium having a refractive index different from the medium constituting the three-dimensional photonic crystal structure. FIG. 22A is an x-z sectional view of the waveguide structure L, and FIG. 22B and FIG. 22C are x-y sectional views thereof.

The present embodiment concerns a structure that includes a first line defect member 70 extending in the y-axis direction and having a width 0.60P, and a second line defect member 700 provided by forming a portion of a columnar structure 700a, disposed in a layer different from the first line defect member and extending in the y-axis direction, by use of a medium having a refractive index 1.7. The refractive index of the medium constituting each defect member 70 and 700 is taken as the defect member refractive index. In FIG. 22 and Table 11, the defect member width is denoted by 70w and 700w. The defect member height is denoted by 70h and 700h, and the defect member refractive index is denoted by 70n and 700n.

TABLE 11

| Waveguide Structure L | |
|---|---|
| Photonic Crystal Structure F | |
| Refractive Index | 2.4 |
| In-Plane Lattice Period | P |
| Out-Plane Lattice Period | 1.4P |
| Columnar Structure Width | 0.30P |
| Columnar Structure Height | 0.25P |
| Discrete Structure Width Dw1 | 0.60P |
| Discrete Structure Width Dw2 | 0.40P |
| Discrete Structure Height Dh | 0.05P |
| First Line Defect Member 70 | |
| Center Coordinate (x, z) | (0.00P, 0.00P) |
| Defect Member Refractive Index 70n | 2.4 |
| Defect Member Width 70w | 0.60P |
| Defect Member Height 70h | 0.25P |
| Second Line Defect Member 700 | |
| Center Coordinate (x, z) | (0.00P, −0.35P) |
| Defect Member Refractive Index 700n | 1.7 |
| Defect Member Width 700w | 0.30P |
| Defect Member Height 700h | 0.25P |

Figure 23A:
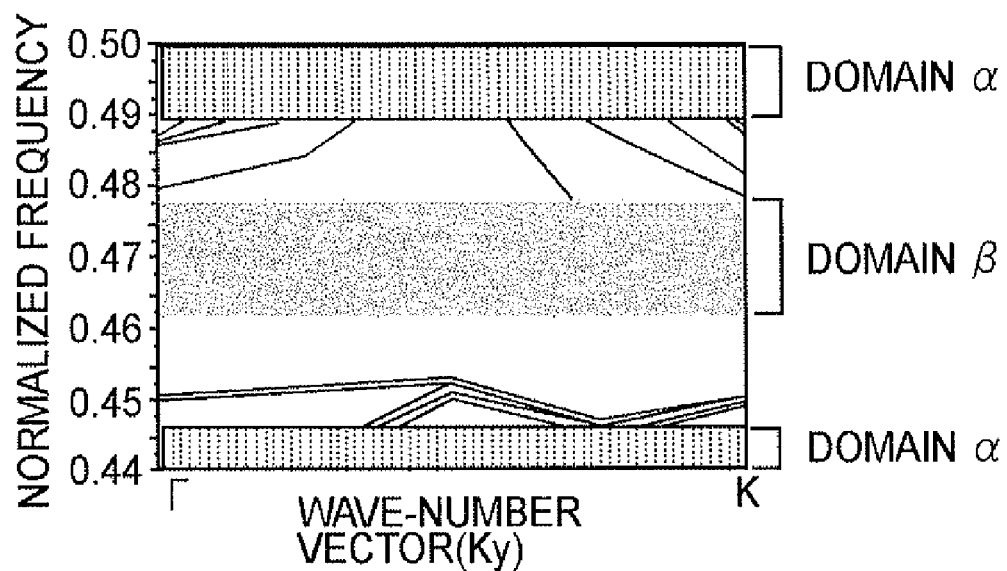
FIG. 23A-FIG. 23C are diagrams for explaining the wave-guiding mode in ninth embodiment of the present invention.

FIG. 23A is a graph showing the result of calculation wherein the plane wave expansion (PWE) method was used to calculate the wave-guiding mode of the waveguide structure L. The axis of abscissas and the axis of ordinate in the graph of FIG. 23A are the same as FIG. 5A. Like FIG. 5A, the frequency band of the domain region α depicted by vertical hatching represents the frequency band other than the complete photonic band gap. Furthermore, the frequency band shown in the domain region β is the frequency band that enables wave-guiding by the single mode, among the waveguide modes.

Figure 23B:
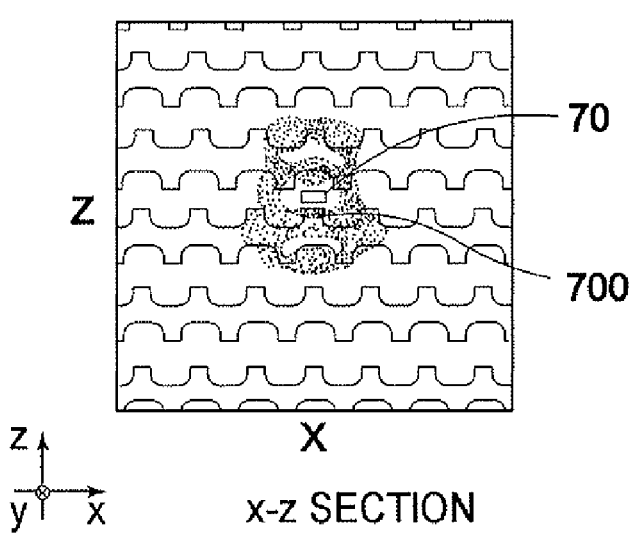
Figure 23C:
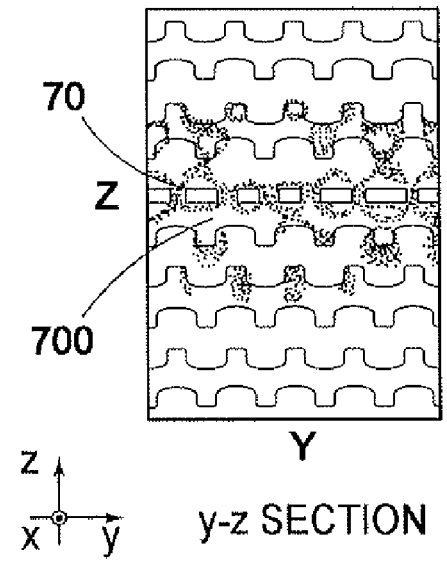

FIG. 23B and FIG. 23C show the field strength distribution in the x-z section and y-z section of the wave-guiding mode in the frequency band that provides single-mode wave-guiding, with the waveguide structure L. In FIG. 23B and FIG. 23C, lower-tone portions depict intense field-strength areas.

As shown in FIG. 23A, the frequency band wherein the wave can be guided by the single mode exists in the range of 0.461 to 0.478. If, in the waveguide structure L, the wave-guiding mode where only the first line defect member 70 is provided and the second line defect member 700 is not provided is calculated by using PWE method, then the frequency band that provides single-mode wave-guiding ranges from 0.460 to 0.467. Hence, with the provision of the second line defect member 700, a waveguide that provides single-mode wave-guiding in large frequency band can be obtained. Furthermore, as shown in FIG. 23B and FIG. 23C, the wave-guiding mode has a field strength distribution with unimodality wherein the field strength heavily concentrates in the vicinity of the center of the waveguide.

Figure 24:
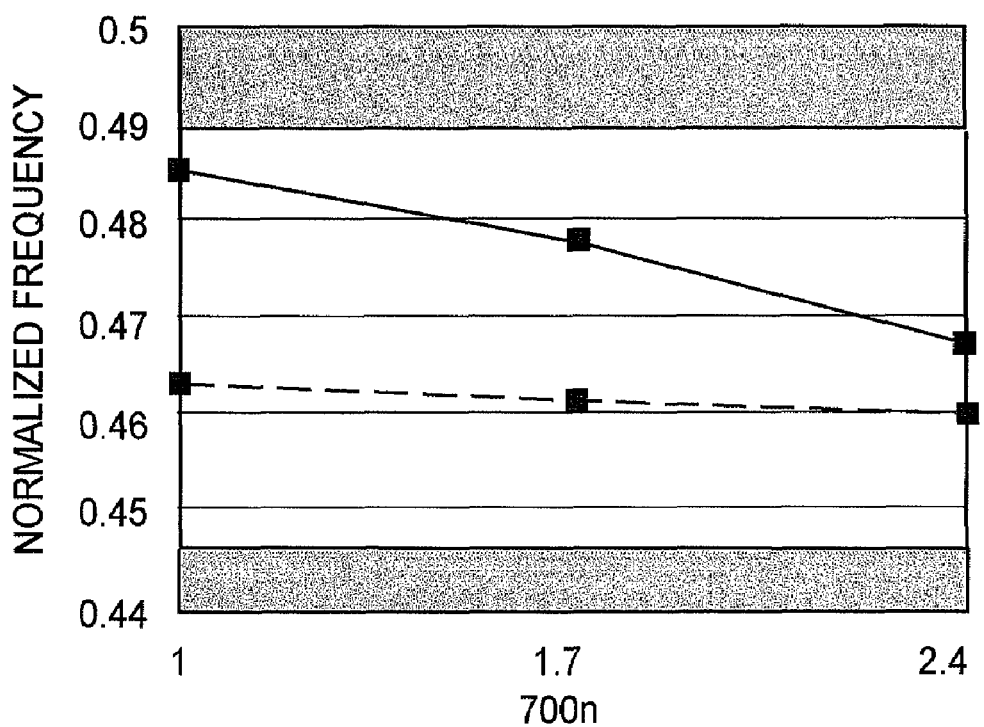
FIG. 24 is a diagram for explaining the wave-guiding mode in the ninth embodiment of the present invention.

FIG. 24 shows changes, in the waveguide structure L, of the frequency band that provides single-mode wave-guiding when the defect member refractive index 700n of the second line defect member 700 is changed.

In FIG. 24, the defect member refractive index 700n is represented in the axis of abscissas, and the normalized frequency is represented in the axis of ordinate. A solid line and a broken line in the drawing, connecting the points in the diagram, represent a high frequency and a low frequency of the frequency band, providing single-mode wave-guiding. As shown in FIG. 24, by changing the refractive index 700n, the frequency band that provides single-mode wave-guiding is changeable. Thus, in the waveguide structure L, the frequency band that provides single-mode wave-guiding can be controlled by changing the refractive index 700n of the second line defect member.

Hence, with the waveguide structure L of the present embodiment, the frequency band that provides single-mode wave-guiding can be controlled, and a mode having an intensity distribution of approximately unimodal shape can be obtained in the plane perpendicular to the wave-guiding direction. The reason therefor is the same as has been described hereinbefore.

Furthermore, in the present embodiment, like the waveguide structure F, it is not influenced by the refractive index of the medium of the columnar structure, constituting the photonic crystal. Thus, regardless of the refractive index of the medium forming the three-dimensional photonic crystal structure, the band that provides single-mode wave-guiding can be controlled on the basis of the defect member refractive index 700n of the second line defect member 700.

In the present embodiment, a layer which includes a columnar structure extending in the same direction as the first line defect member 70 and which is positioned closest to the first line defect member 70, is selected. Although the second line defect member 700 is provided in the columnar structure adjacent the first line defect member, it may be provided in any other columnar structures. For example, the second line defect member may be disposed in a layer which includes a columnar structure extending in the same direction as the first line defect member and which is located closest thereto, and it may be provided at such columnar structure located at a further remote position. Similar advantageous results are obtainable with that. Furthermore, the second line defect member may be provided at the columnar structure which is located in a layer further remote from the first line defect member in the lamination direction, and similar advantageous results are obtainable with that.

Furthermore, in place of the columnar structure or in combination with that, the second line defect member may be provided in a portion of the discrete structure as shown in FIG. 20, and similar advantageous results are obtainable with that. The distance between the first line defect member and the second line defect member in the lamination direction should preferably be made within the length of the out-plane lattice period, with effective results. Furthermore, the number of the columnar structures and the discrete structures where the second line defect member should be provided is not limited to the example of the present embodiment. It may be not more than 3, or not less than 5. Furthermore, when plural line defect members are provided, they may have different defect refractive indices. By controlling the number of the second line defect members and the position of them carefully, the frequency of the wave-guiding mode can be controlled more precisely.

As described, the present embodiment has been explained with reference to an example in which, based on a three-dimensional photonic crystal structure, a defect member is formed to provide a waveguide.

With the waveguide structure according to these embodiments, a waveguide that provides wave-guiding in a single mode and a mode having a desired intensity distribution, can be realized.

Note that the electrical field distribution of the wave-guiding mode has a property that it is liable to concentrate on a high dielectric medium. Therefore, if the second line defect member is provided near the first line defect member, the electric field distribution of the wave-guiding mode is affected by the second line defect member. In consideration of this, it is desirable that the position, shape, medium and displacement direction of the second line defect member should preferably be so determined as to provide good symmetry in the plane perpendicular to the wave-guiding direction, around the first line defect member, with respect to the lamination direction or a direction along the laminated layers.

The medium to be used to constitute the waveguide using a three-dimensional photonic crystal discussed above may be just what has been described with reference to the first embodiment. Furthermore, as regards the manufacturing processes of the three-dimensional photonic crystal, those manufacturing processes described with reference to the first embodiment can be used.

Furthermore, although in the preceding embodiments three-dimensional photonic crystals having a layer including two levels of discrete structures in an added layer has been described, the present invention is not limited to this. For example, even if a three-dimensional photonic crystal structure having a layer including one level or three or more levels of discrete structures or a three dimensions photonic crystal structure having a discrete structure in one side of the columnar structure is used, by providing a line defect member at the position described above, similar advantageous results are obtainable.

Furthermore, when a portion of a columnar structure or a discrete structure is deformed to provide the second line defect member, in place of changing the shape, the position or refractive index thereof may be changed.

Furthermore, in addition to the shape change, the position and/or the refractive index thereof may be changed.

Embodiment 10

A device having a waveguide according to a tenth embodiment of the present invention will now be explained.

First of all, a light emitting element will be explained. A waveguide comprised of a line defect member as well as a point defect member are provided in a three-dimensional photonic crystal. The point defect member can function as a resonator having a resonance mode in a desired frequency in PBG, when the shape or medium thereof is optimized.

A luminous medium having an emission spectrum including the resonance wavelength is disposed inside the resonator, and energy such as electromagnetic wave or current is supplied to this luminous medium from the outside. By this, a light emitting device such as laser or LED, having very high efficiency, can be realized. Where a waveguide is placed adjacent to a point defect resonator like this and the waveguide has a wave-guiding mode in the frequency of the resonance mode of the resonator, the light generated inside the resonator couples with the wave-guiding mode, and it is extracted outwardly from the resonator. The extracted light propagates inside the waveguide as the wave-guiding mode, and at the end of the waveguide, it couples with a mode that propagates through the free space of the three-dimensional photonic crystal. Hence, the light can be taken out of the three-dimensional photonic crystal.

Figure 25A:
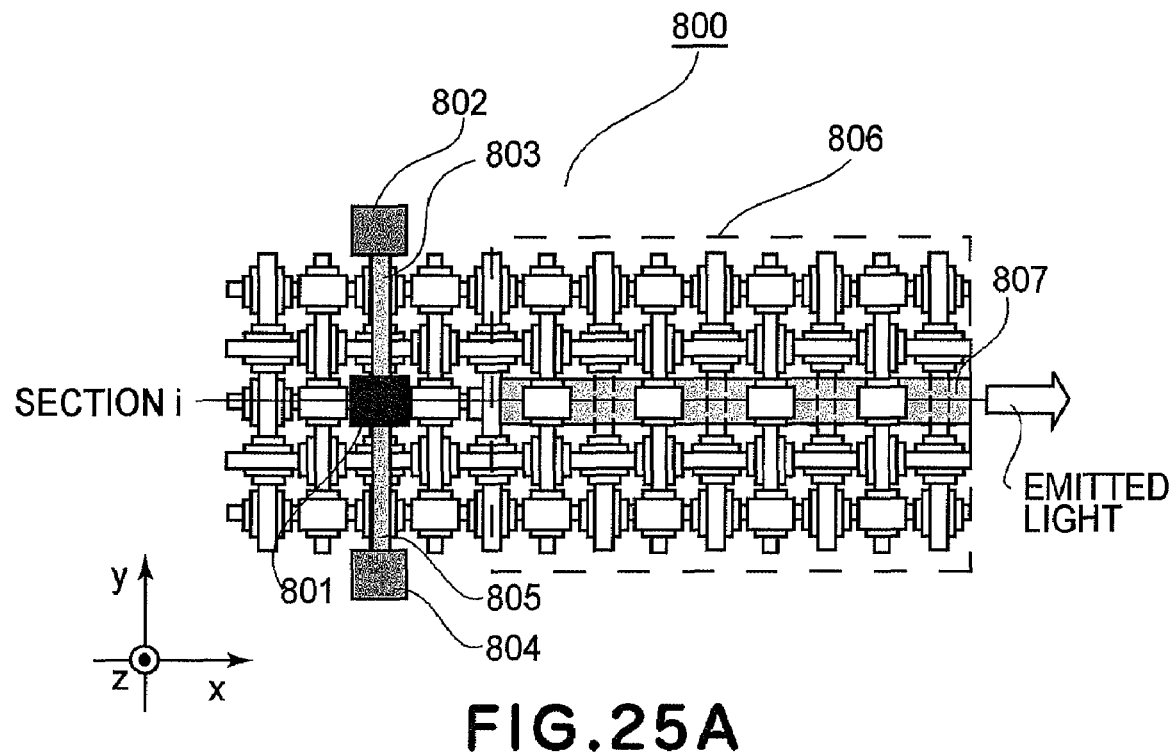
FIG. 25A and FIG. 25B are schematic diagrams for explaining a main portion of the tenth embodiment of the present invention.
Figure 25B:
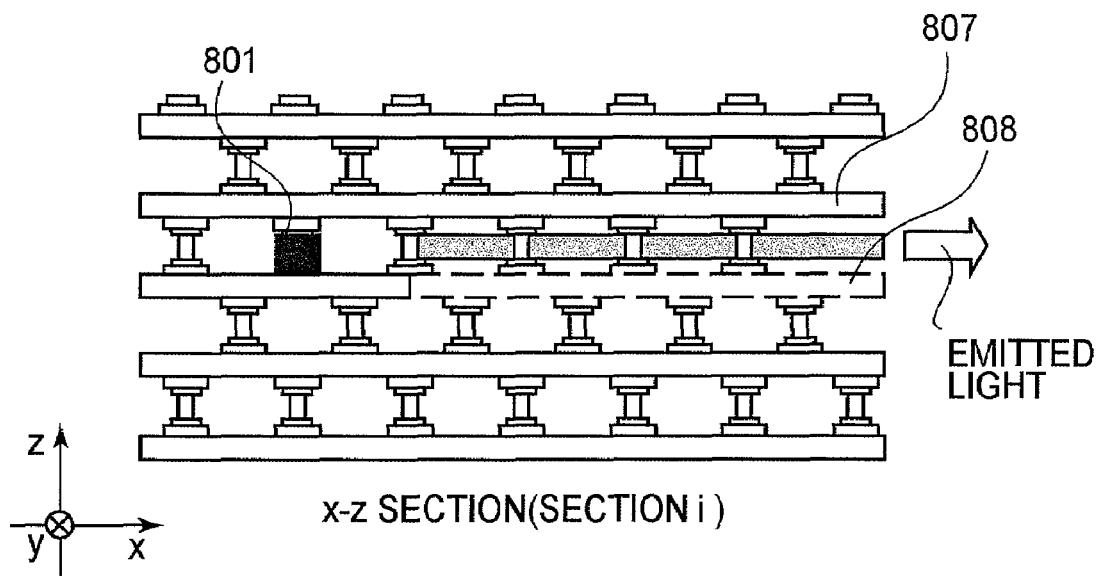

FIG. 25A and FIG. 25B are schematic diagrams of a structural example of a light emitting element 800 according to a tenth embodiment of the present invention, that comprises a waveguide and a point defect member formed with an active member which emits light in response to carrier injection. FIG. 25A and FIG. 25B are an x-y sectional view and an x-z sectional view. In FIG. 25A and FIG. 25B, the light emitting element 800 comprises a resonator 801a formed by providing a point defect member 801 in a three-dimensional photonic crystal structure, a p-type electrode 802, a p-type carrier conducting pathway 803, an n-type electrode 804, and an n-type carrier conducting pathway 805. An active member which provides light emitting function in response to carrier injection, is formed inside the resonator 801a. Electron holes are supplied into the resonator 801a through the p-type electrode 802 and the p-type carrier conducting pathway 803, and electrons are supplied into the resonator 801a through the n-type electrode 804 and the n-type carrier conducting pathway 805. These are coupled with each other within the resonator 801a to generate light emission and laser oscillation.

The waveguide 806 of the present embodiment is provided so as to take this light outwardly from the resonator 801a. The waveguide structure of the waveguide 806 has a columnar shape extending in the x-axis direction. This waveguide comprises a first line defect member 807 made of a medium having the same refractive index as the columnar structure of the three-dimensional photonic crystal, and a second line defect member 808 disposed in a layer different from the first line defect member 807. By optimizing the second line defect member 808 by deforming it or changing the medium constituting the same, a waveguide 806 having a wave-guiding mode which enables wave-guiding in the single mode in the frequency of the resonance mode of the resonator 801a, can be realized. By disposing this waveguide 806 at an appropriate position with respect to the resonator 801a, the resonance mode of the resonator 801a can be converted into a wave-guiding mode efficiently, and it can be taken out of the three-dimensional photonic crystal, from the waveguide end 806a. Hence, by using the waveguide structure according to the present embodiment, the wave-guiding mode can be controlled so that the frequency of the resonance mode and the frequency band that provides single-mode wave-guiding of the waveguide match with each other. Furthermore, the waveguide 806 of the present embodiment has a wave-guiding mode in which the field strength heavily concentrates on the waveguide center in a plane perpendicular to the wave-guiding direction. Because of this, light having no asymmetric distortion in the field strength distribution can be taken out from the waveguide end 806.

As described above, with the waveguide 806 and the point defect resonator 801a according to the present embodiment, a high-performance laser device can be realized.

Figure 26A:
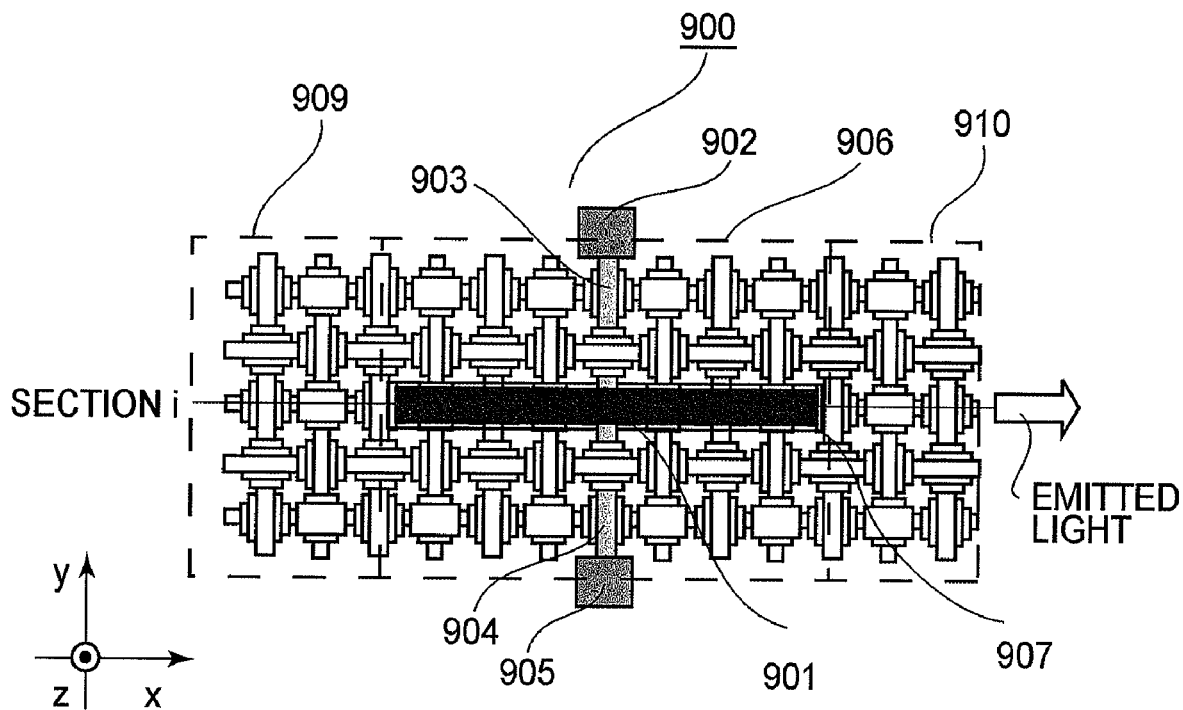
FIG. 26A and FIG. 26B are schematic diagrams for explaining a main portion of the tenth embodiment of the present invention.
Figure 26B:
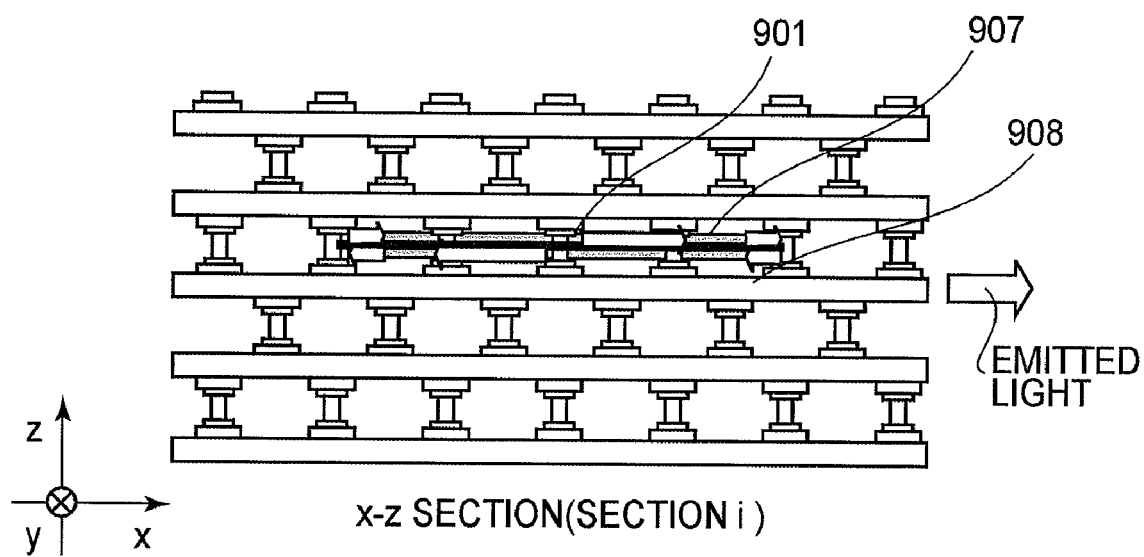

FIG. 26A and FIG. 26B are schematic diagrams of a structural example of a light emitting element 900 which comprises a waveguide formed with an active medium in the line defect of the waveguide based on line defect of the present invention, and excitation means for exciting the active medium.

FIG. 26A and FIG. 26B are an x-y sectional view and an x-z sectional view. A waveguide 906 according to the present embodiment is provided inside a three-dimensional photonic crystal structure. In FIG. 26A and FIG. 26B, there is a first line defect member 907 having a columnar shape extending in the x-axis direction and made of a medium having the same refractive index the columnar structure of the three-dimensional photonic crystal. Also, there is a waveguide comprising a second line defect member 908 which is disposed in a layer different from the first line defect member 907 and which is formed by deforming a portion of the columnar structure extending in the same direction as the first line defect member. Here, three-dimensional photonic crystals 909 and 910 are disposed outside the waveguide to assure that the waveguide ends have a high reflectivity surface.

Furthermore there is an active member 901 (line defect member) which provides a light emitting function in response to carrier injection, the active member being formed inside the line defect member 907. Also, there are a p-type electrode 902, a p-type carrier conducting pathway 903, an n-type electrode 904, and an n-type carrier conducting pathway 905. Through the p-type electrode 902 and the p-type carrier conducting pathway 903, electron holes are supplied into the line defect member 901. Through the n-type electrode 904 and the n-type carrier conducting pathway 905, electrons are supplied into the line defect member 901. These are coupled with each other inside the line defect member 901, to cause light emission. The emitted light is wave-guided inside the line defect member 901, and it is reflected by the waveguide end surface, such that it reciprocally propagates inside the line defect member 901. Here, the length of the waveguide 906 in waveguide direction (x-axis direction) and the structural parameters thereof are designed appropriately so that a resonance condition is satisfied with respect to the wave-guiding mode of the light emitted from the active member. Then, the emitted light resonates inside the line defect member 901, and laser oscillation is produced.

The waveguide 906 of the present embodiment has a wave-guiding mode in which the field strength heavily concentrates on the waveguide center, in a plane (y-z plane) perpendicular to the wave-guiding direction. Because of this, light having no asymmetric distortion in the field strength distribution can be taken out from the waveguide end. Furthermore, since the wave-guiding mode can be controlled by deforming the second line defect member 908 or changing the medium constituting the same, the resonance condition can be satisfied with respect to light of arbitrary wavelength, and laser oscillation can be produced.

As described above, the present embodiment provides a light emitting element which comprises a waveguide having an active medium in the line defect of the waveguide and excitation means for exciting the active medium.

Figure 27A:
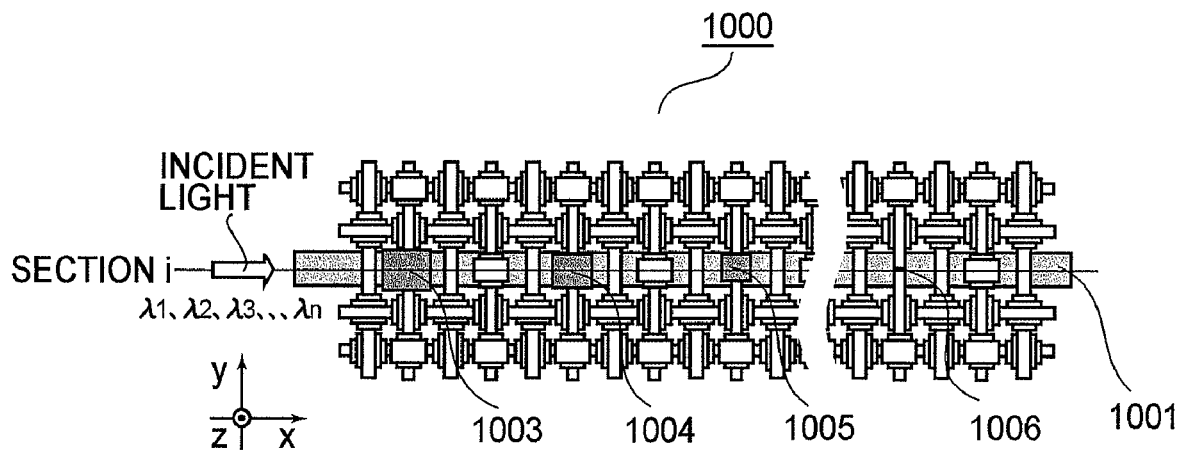
FIG. 27A and FIG. 27B are schematic diagrams for explaining a main portion of the tenth embodiment of the present invention.
Figure 27B:
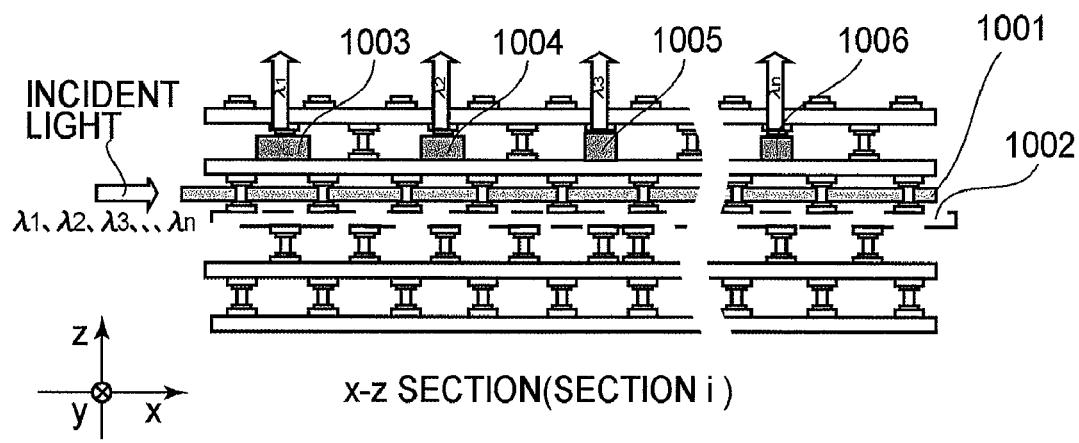
Figure 29A:
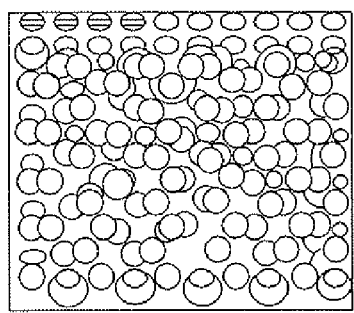
FIG. 29A-FIG. 29F are diagrams for explaining conventional photonic crystal structures.
Figure 29B:
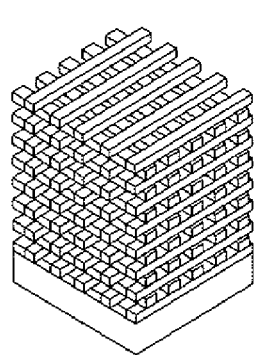
Figure 29C:
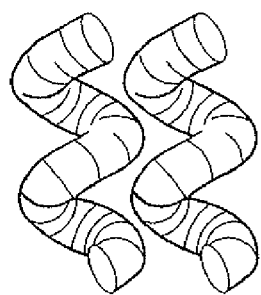
Figure 29D:
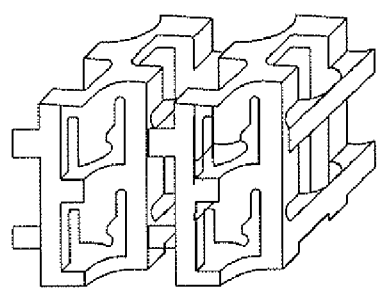
Figure 29E:
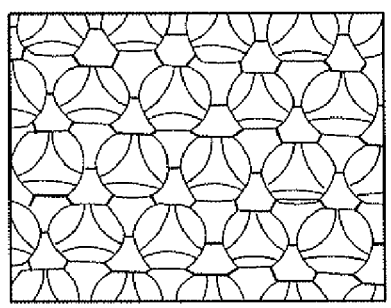
Figure 29F:
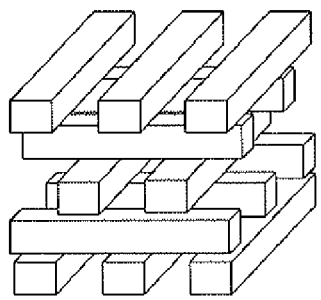
Figure 30A:
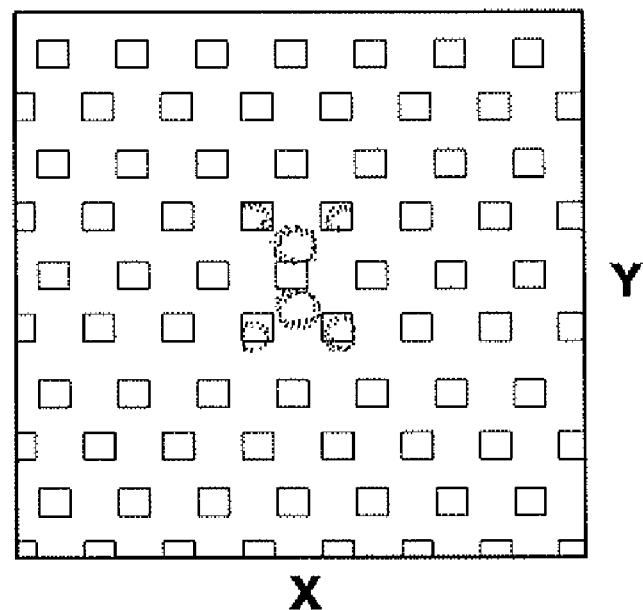
FIG. 30A and FIG. 30B are diagrams for explaining the field strength distribution of conventional photonic crystals.
Figure 30B:
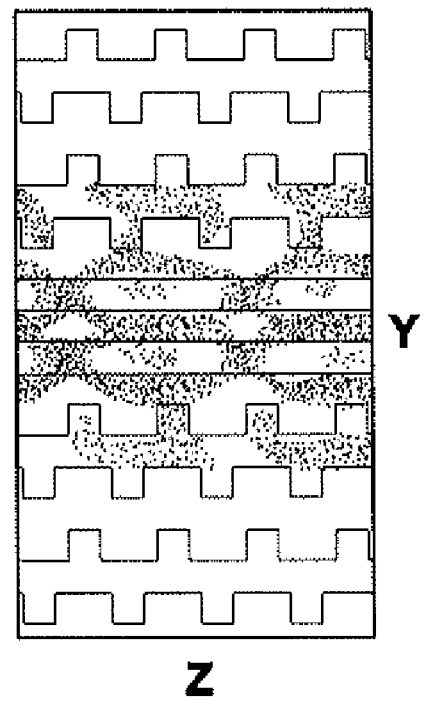

FIG. 27 is a schematic diagram of a structural example of an optical decoupler (demultiplexer) circuit 1000 having a waveguide and a point defect resonator according to the present invention.

The optical decoupler circuit 1000 comprises a waveguide provided inside a three-dimensional photonic crystal structure. In FIG. 27, there is a first line defect member 1001 having a columnar shape extending in the x-axis direction and being made of a medium having the same refractive index as the columnar structure of the three-dimensional photonic crystal. Also, there is waveguide comprising a second line defect member 1002 which is located in a layer different from the first line defect member 1001 and which is provided by deforming a portion of the columnar structure extending in the same direction as the first line defect member 1001. Furthermore, there are resonator structures 1003-1006 which comprise a point defect provided adjacent the waveguide. Although it is schematically illustrated in the diagram of FIG. 27, actually resonators of a number n are provided in relation to the wave decoupling number n, and desired optical decoupling can be realized by this.

The resonator structures 1003-1006 are designed to work with different resonant wavelengths, respectively. Furthermore, the waveguide structure is so designed as to provide single-mode wave-guiding in the wavelength band including the wavelength to be decoupled. In order to control the wave-guiding mode to enable single-mode wave-guiding in the band including the resonance frequency, the position, number and shape of the second line defect members 1002 may be controlled in desired combination.

Figure 28:
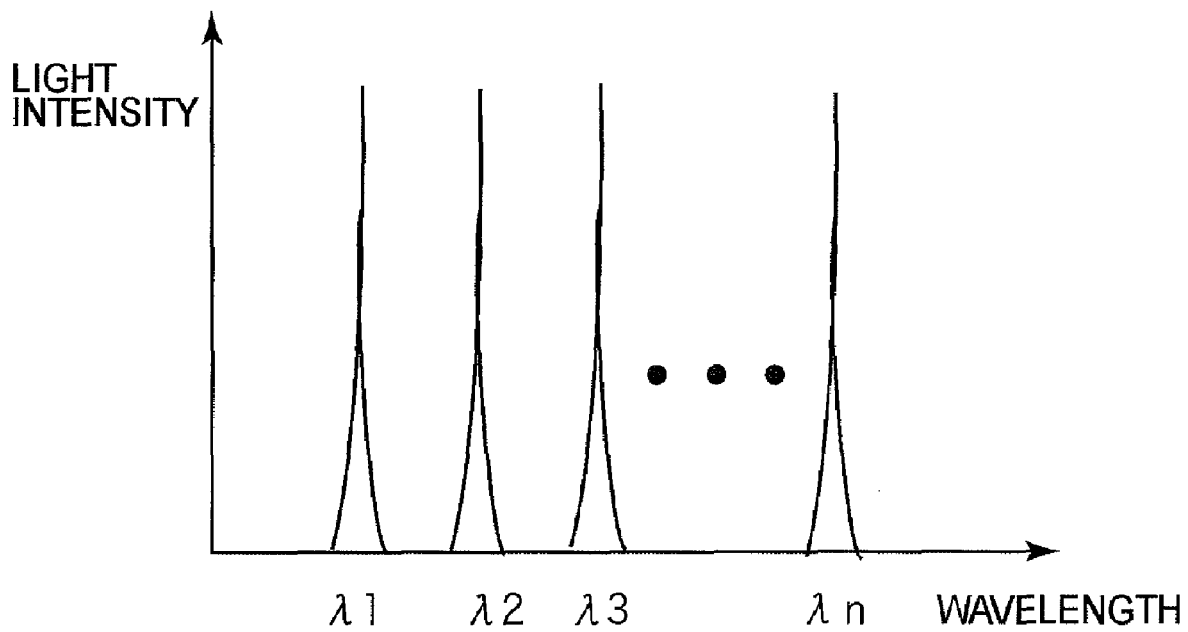
FIG. 28 is a diagram for explaining the spectrum in the tenth embodiment of the present invention.

In the waveguide structure such as described above, incident light having spectrum such as shown in FIG. 28 and including resonance wavelengths $\lambda 1, \lambda 2, \lambda 3, \ldots \lambda n$ of the point resonators 1003-1006 is inputted into the waveguide. Then, a light beam having a wavelength component corresponding to each resonant wavelength can be taken up, with the resonators 1003-1006, respectively.

On the other hand, to the contrary to this, the waveguide structure may be used to couple the light into the waveguide, from the resonators 1003-1006. Such optical device is useful as an optical decoupler/coupler (optical demultiplexer/multiplexer) device, usable with the optical communication band.

Alternatively, among incident light, a light beam of unnecessary wavelengths may be directed to resonators comprising point defects so that it is extracted (emitted), by which only wanted wavelengths can be outputted from the end of the waveguide (i.e. it functions as a wavelength filter).

With use of the waveguide which is based on the three-dimensional photonic crystal structure according to the present embodiment, an optical decoupling device that ensures optical decoupling in a desired wavelength band can be realized.

As described above, by using a waveguide comprising a line defect according to the present embodiment, and a wavelength filter comprising a resonator based on the point defect, a high-performance optical decoupling/coupling (demultiplexer/multiplexer) circuit can be realized.

As regards the luminous medium described in the preceding embodiment, various media may be used in accordance with a desired emission wavelength. For example, a compound semiconductor, inorganic light emitting material, organic light emitting material, high polymer molecule light emitting material, quantum dot, or nanocrystal may be used. As regards the excitation method, photo-excitation by an outside light source, excitation by current injection, excitation by electric-field application, and so on are applicable. In the case of excitation by current injection, a metal material such as Al or Cr or a transparent conductive material such as ITO may be gripped as an electrode, to cause light emission. Furthermore, when an electrode that works independently with respect to plural resonator structures is prepared, light to be emitted from the resonators can be controlled independency.

Such devices will be suitable for a light source of a display unit, a light source for optical communication, a THz light source, a light source for an optical pickup in DVD or next-generation blue light recording media.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-229476 filed Aug. 25, 2006, for which is hereby incorporated by reference.

What is claimed is:

1. A waveguide, comprising:
a three-dimensional photonic crystal having a plurality of line defect members,
wherein said three-dimensional photonic crystal includes a first layer in which a plurality of columnar structures are arrayed with a spacing, a second layer in which a plurality of columnar structures extending in a direction perpendicular to a direction along which the columnar structures of the first layer extend are arrayed with a spacing, a third layer in which a plurality of columnar structures extending in the same direction as the columnar structures of the first layer are arrayed with a spacing, and a fourth layer in which a plurality of columnar structures extending in the same direction as the columnar structures of the second layer are arrayed with a spacing, wherein the columnar structures of the first and third layers are mutually deviated by a half of the spacing in a direction perpendicular to the direction in which the columnar structures extend, while the columnar structures of the second and fourth layers are mutually deviated by a half of the spacing in a direction perpendicular to the direction in which the columnar structures extend, wherein the line defect members include a first line defect member made of a medium having a refractive index not smaller than that of the columnar structures and formed in a direction perpendicular to the direction in which the columnar structures extend, and a second line defect member formed in the same direction as the first line defect member.

2. A waveguide according to claim 1, wherein the second line defect member has a structure that a portion of the columnar structure extending in the same direction as the first line defect member is deformed.

3. A waveguide according to claim 1, wherein the second line defect member has a structure that a portion of the columnar structure extending in the same direction as the first line defect member is made of a medium having a refractive index smaller than that of the columnar structure.

4. A waveguide according to claim 1, wherein said three-dimensional photonic crystal further comprises a supplement layer including at least one layer having a discrete structure disposed discretely in a plane parallel to the first to fourth layers, wherein the first to fourth layers are combined with each other with the supplement layer interposed between individual layers, and wherein the discrete structure of the supplement layer is disposed at a position corresponding to a point of intersection of the columnar structures.

5. A waveguide according to claim 4, wherein the second line defect member is formed in a portion of the discrete structure arrayed in the same direction as the first line defect member.

6. A waveguide according to claim 5, wherein the second line defect member has a structure that a portion of the discrete structure arrayed in the same direction as the first line defect member is deformed.

7. A waveguide according to claim 5, wherein the second line defect member has a structure that a portion of the discrete structure arrayed in the same direction as the first line defect member is made of a medium having a refractive index smaller than that of the medium of the discrete structure.

8. A waveguide according to claim 4, wherein the second line defect member is formed in a portion of the columnar structure extending in the same direction as the first line defect member, and in a portion of the discrete structure arrayed in the same direction as the first line defect member.

9. A waveguide according to claim 8, wherein the second line defect member has a structure that a portion of the columnar structure extending in the same direction as the first line defect member and a portion of the discrete structure arrayed in the same direction as the first line defect member are deformed.

10. A waveguide according to claim 8, wherein the second line defect member has a structure that a portion of the columnar structure extending in the same direction as the first line defect member is made of a medium having a refractive index smaller than that of the medium of the columnar structure and that a portion of the discrete structure arrayed in the same direction as the first line defect member is made of a medium having a refractive index smaller than that of the medium of the discrete structure.

11. A waveguide according to claim 1, wherein the first line defect member and the second line defect member are disposed in a layering direction of said three-dimensional photonic crystal and in a range of an out-plane lattice period.

12. A waveguide according to claim 1, wherein at least a portion of the second line defect member is formed at one of the columnar structure which is nearest to the first line defect member.

13. A light emitting device, comprising:
a waveguide as recited in claim 1; and
a resonator based on a point defect member of said three-dimensional photonic crystal,
wherein light from said resonator is wave-guided by said waveguide.

14. A light emitting device, comprising:
a waveguide as recited in claim 1; and
exciting means,
wherein the first line defect member and the second line defect member of said waveguide include an active medium, and
wherein said exciting means is configured to excite the active medium.

15. An optical coupling and decoupling circuit, comprising:
a waveguide as recited in claim 1; and
a resonator based on a point defect member of said three-dimensional photonic crystal.

* * * * *